May 23, 1967     J. S. KAMBORIAN ETAL     3,320,626
HEEL SEAT LASTING

Filed March 20, 1964     13 Sheets-Sheet 1

INVENTORS
Jacob S. Kamborian
BY Michael M. Becka

Albert Gordon
ATT'Y

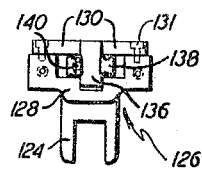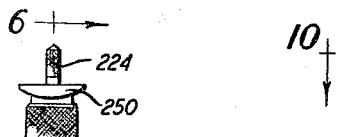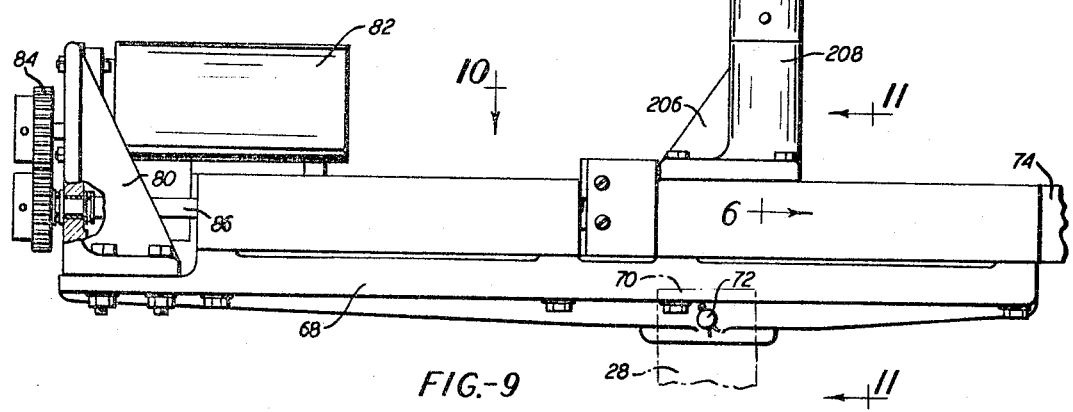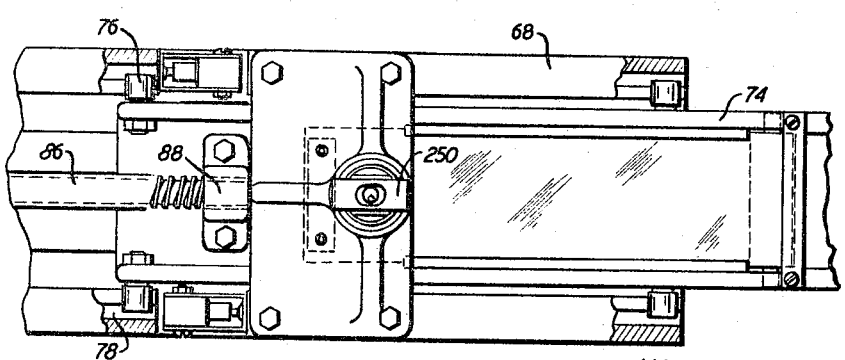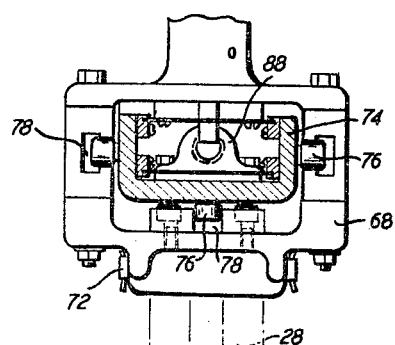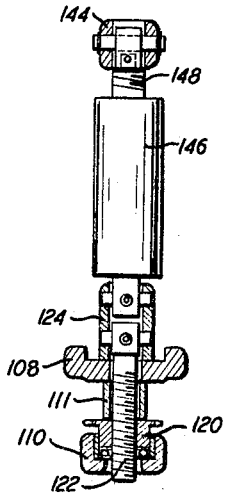

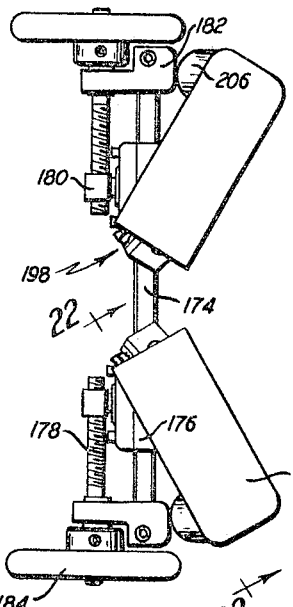
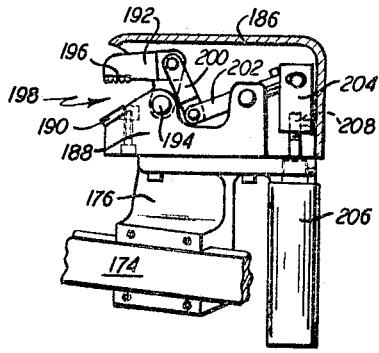
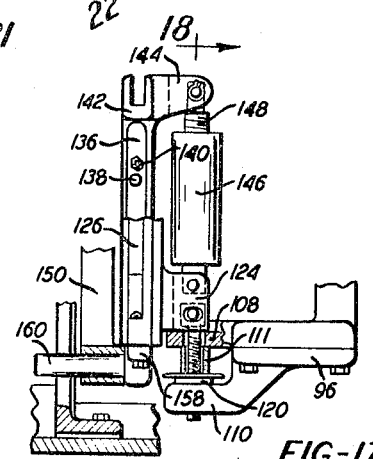
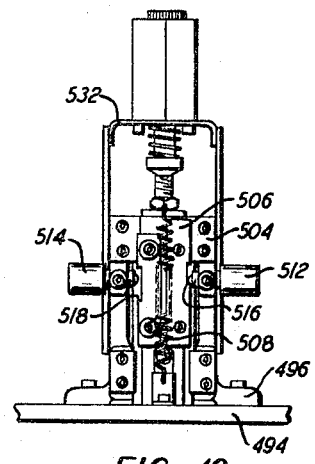
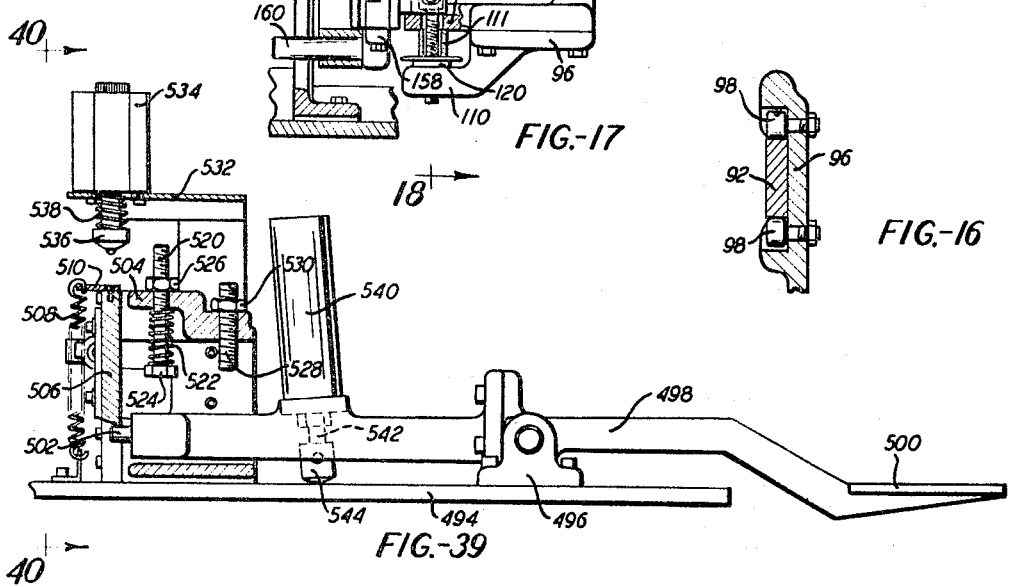

May 23, 1967  J. S. KAMBORIAN ETAL  3,320,626
HEEL SEAT LASTING

Filed March 20, 1964  13 Sheets-Sheet 12

United States Patent Office 3,320,626
Patented May 23, 1967

3,320,626
HEEL SEAT LASTING
Jacob S. Kamborian, 70 Crestwood Road, West Newton, Mass. 02165, and Michael M. Becka, Cambridge, Mass.; said Becka assignor to said Kamborian
Filed Mar. 20, 1964, Ser. No. 353,462
84 Claims. (Cl. 12—145)

This invention deals with the performance of various operations on a shoe. The principal object of the invention is to perform a pulling over and heel seat lasting operation on a shoe and is intended to be an improvement over the invention of pending application Ser. No. 107,156 filed May 2, 1961, now Patent No. 3,189,924.

The illustrative embodiment of the invention is incorporated in a machine that has a post swingably mounted for movement about an upright axis. A shoe supporting mechanism, that includes a platform, is supported on the post to partake of its swinging movement, and a shoe assembly supporting plate and last pin are mounted on the shoe supporting mechanism to support bottom-down a shoe assembly that includes a last having an upper mounted thereon and insole located on its bottom. A brake is provided to lock the post in position after the post, together with the shoe supporting mechanism, has been swung to a predetermined position about the axis of the post to thereby properly orient the heel of the shoe assembly in the machine.

A base, mounted on the platform, has a framework thereon. A toe rest, for supporting the vamp of the shoe assembly and two sets of pincers for gripping the forepart portions of the margin of the upper are mounted in the framework. Powered means are provided to move the pincers forwardly and then upwardly with the toe rest remaining stationary during these movements. An adjusting mechanism is also provided in the framework for adjusting in unison the heightwise positions of the toe rest and pincers.

The post is movable upwardly, after the shoe upper has been stretched tightly on the last by the forward movement of the pincers and prior to the upward movement of the pincers, to clamp the shoe assembly between the shoe supporting mechanism and a hold-down foot of a hold-down mounted on the machine frame. The hold-down foot is initially in a rearward position where it will not interfere with the placement of the shoe assembly on the shoe supporting mechanism or the stretching of the upper about the last by the forward movement of the pincers and is moved to a forward position above the shoe assembly before the post is raised.

The machine frame has a plate slidable therein from an initial rearward position to a forward position. The plate has a heel clamp mounted for movement in unison therewith that is intended to clamp against the heel of the shoe assembly. A braking mechanism is provided to lock the plate in position in response to the engagement of the heel clamp with the heel of the shoe assembly. The plate also has wipers mounted thereon for movement in unison therewith. The wipers are constructed and driven with respect to the plate substantially as shown in pending application Ser. No. 294,351 filed July 11, 1963 to fiirst be translated forwardly over the heel of the shoe assembly and then to swing inwardly about their vertex to wipe the heel portion of the upper margin against the insole. A control is provided that is actuable toward the end of the inward swinging movement of the wipers to raise the hold-down foot and increase the upward pressure of the post so that the bottom of the shoe assembly is forced upwardly against the wiper bottoms with increased bedding pressure. The forepart pincers are caused to release their grip on the upper margin concomitantly with the inward swinging movement of the wipers.

When the machine has completed its cycle the parts are returned to their idle position. During this return, a plunger is caused to move upwardly of the shoe support to eject the shoe assembly from the shoe support.

The various instrumentalities in the machine are operated by fluid actuated motors. A control mechanism is provided for operating these motors in a desired predetermined sequence. The control mechanism comprises a plate and three valves that are so constructed that movement of the plate will actuate the valves in sequence with the earlier actuated valves remaining in actuated condition when the later actuated valves are actuated.

In the accompanying drawings:
FIG. 1 is a side elevation of the machine;
FIG. 2 is a view taken on the line 2—2 of FIG. 1;
FIG. 3 is a side elevation of the post and post locking mechanism;
FIG. 4 is a view taken on the line 4—4 of FIG. 3;
FIG. 5 is a view taken on the line 5—5 of FIG. 3;
FIG. 6 is a vertical section of the shoe assembly supporting mechanism and shoe assembly ejecting mechanism taken on the line 6—6 of FIG. 9;
FIG. 7 is a section to an enlarged scale of the upper portion of the mechanism shown in FIG. 6;
FIG. 8 is a section taken on the line 8—8 of FIG. 7;
FIG. 9 is a side elevation view of the shoe supporting mechanism;
FIG. 10 is a view taken on the line 10—10 of FIG. 9;
FIG. 11 is a view taken on the line 11—11 of FIG. 9;
FIG. 12 is a side elevation of the framework that incorporates the toe rest and the pincers;
FIG. 13 is a view taken on the line 13—13 of FIG. 12;
FIG. 14 is a view taken on the line 14—14 of FIG. 12;
FIG. 15 is a view taken on the line 15—15 of FIG. 12;
FIG. 16 is a view taken on the line 16—16 of FIG. 12;
FIG. 17 is a side elevation of the mechanism in the framework for moving the pincers upwardly;
FIG. 18 is a view taken on the line 18—18 of FIG. 17;
FIG. 19 is a view taken on the line 19—19 of FIG. 14;
FIG. 20 is a view taken on the line 20—20 of FIG. 14;
FIG. 21 is a plan vieew of the pincers;
FIG. 22 is a view taken on the line 22—22 of FIG. 21;
FIG. 23 is a view taken on the line 23—23 of FIG. 1;
FIG. 24 is a side elevation of the plate with the heel clamp mounted thereon;
FIG. 25 is a view taken on the line 25—25 of FIG. 24;
FIG. 26 is a view taken on the line 26—26 of FIG. 24;
FIG. 27 is a view taken on the line 27—27 of FIG. 26;
FIG. 28 is a view taken on the line 28—28 of FIG. 26;
FIG. 29 is a view to an enlarged scale of the plate braking mechanism that is taken on the line 29—29 of FIG. 27;
FIG. 30 is a detail showing the mounting of the heel clamp that is taken on the line 30—30 of FIG. 25;
FIG. 31 is a plan view of the wipers and wiper driving mechanism;
FIG. 32 is a view taken on the line 32—32 of FIG. 31;
FIG. 33 is a view taken on the line 33—33 of FIG. 31;
FIG. 34 is a view taken on the line 34—34 of FIG. 31;
FIG. 35 is a bottom view of the wipers;
FIG. 36 is a view taken on the line 36—36 of FIG. 35;
FIG. 37 is a plan view of the hold-down;
FIG. 38 is a view taken on the line 38—38 of FIG. 37;
FIG. 39 is a side elevation of the motor control mechanism;
FIG. 40 is a view taken on the line 40—40 of FIG. 39;
FIG. 41 is a view taken of the heel portion of a shoe upper with a counter inserted in a pocket attached to the upper that it is preferred to use as part of the shoe assembly;

Figure 1:
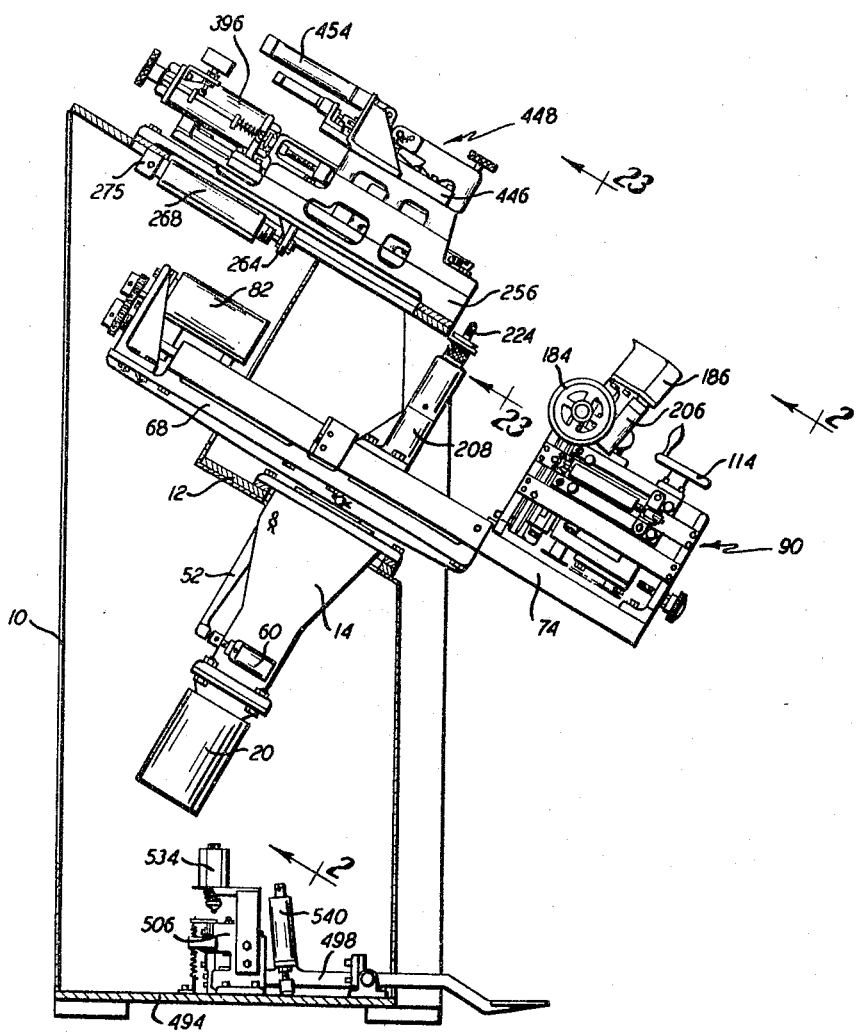

Referring to FIG. 1, the machine includes a frame 10 that comprises a base 12 and a housing 14. The machine is tilted about 30 degrees to enable the operator to have ready access thereto. For ease of explanation, the direction of the base 12 will be referred to as horizontal and the direction of the housing 14 will be referred to as vertical. In operating the machine, the operator stands to the right of the machine as seen in FIG. 1, and parts moving toward the operator (left to right in FIG. 1) will be described as moving forwardly while parts moving away from the operator (right to left in FIG. 1) will be described as moving rearwardly.

Figure 3:
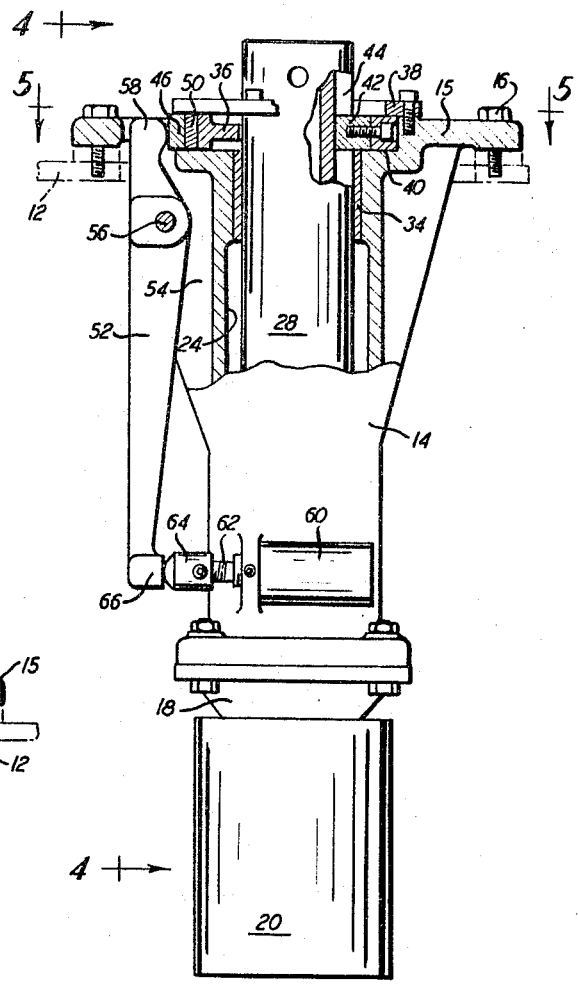
Figure 4:
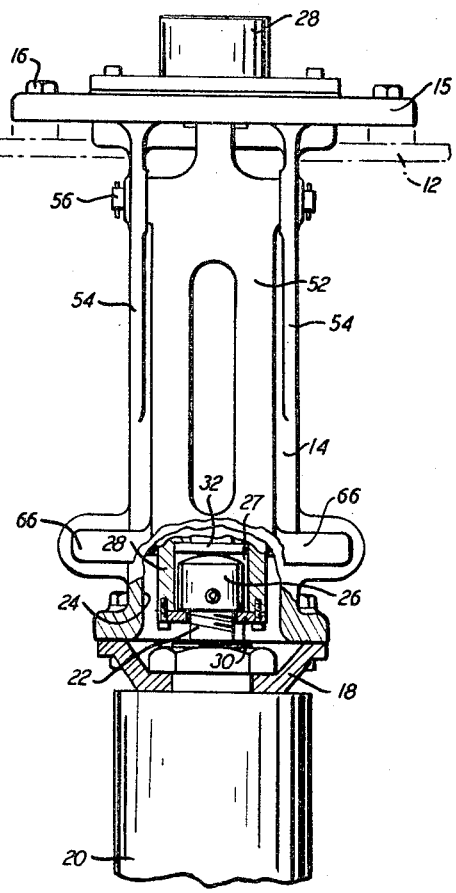
Figure 46:
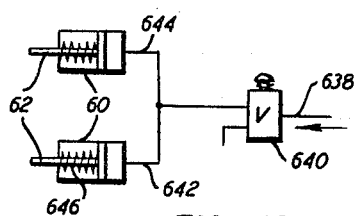
FIG. 46 is a schematic representation of that portion of the machine control circuit that locks the post in position.

Referring to FIGS. 2–5, the housing 14 includes a flange 15 at its top that is secured to the base 12 by bolts 16. A hanger 18, bolted to the bottom of the housing 14, has a vertically extending air operated motor 20 secured thereto. The motor 20 has a piston rod 22 extending upwardly into a cavity 24 in the housing 14. A knob 26, pinned to the top of the piston rod 22, is received in a recess 27 in the bottom of the post 28 and is interposed between a cap 30 secured to the bottom of the post and a disc 32 at the top of the recess. A sleeve 34, fitted in the housing 14, guides the post 28 for vertical movement in the housing and the connection formed by the members 26, 30 and 32 enables the post to partake of the vertical movement of the piston rod 22 and swing about the vertical axis of the post and piston rod. A first brake member in the form of a ring 36 is mounted in the housing 14 between a cap 38 bolted to the flange 15 and a shoulder 40 in the housing. The ring 36 is rotatable within the housing 14 in a horizontal plane. A key 42 secured to the ring is received in a vertically extending slot 44 in the post 28 so as to enable the ring and post to swing in unison about the vertical axis of the post and yet permit the post to move vertically. A second brake member in the form of a plate 46 is slidably guided in a cut-out 48 in the flange 15 for radial movement with respect to the ring 36. A brake pad 50 on the plate 46 is adapted to bear against the periphery of the ring 36. A lever 52 is positioned between two projections 54 of the housing 14 and is pivoted to the projections by pins 56. A cam 58 at the upper end of the lever is located outwardly of the brake plate 46. A pair of spring return air operated motors 60, FIGS. 3 and 46, are secured to the housing 14 on opposite sides thereof. The piston rods 62 of the motors 60 have cams 64 secured thereto that are each in alignment with an offset 66 at the bottom of the lever 52. Leftward movement of the cams 64 (FIG. 3) will cause the lever 52 to swing clockwise to move the cam 58 to the right and press the brake pad 50 against the ring 36 and thereby lock the ring and the post 28 against rotation about the vertical axis of the post. Rightward movement of the cams 64 will enable the cam 58 to move leftwardly to unlock the ring and post so that they may be swung about the vertical axis of the post.

Referring to FIGS. 9–11, a shoe supporting platform 68 has a socket 70 in its bottom which receives the top of the post 28, and the platform and post are connected by a pin 72. A base 74 is mounted on the platform 68 for horizontal forward and rearward movement by way of rollers 76 rotatably mounted in the base that are movable in tracks 78 in the platform. A bracket 80, secured to the rear end of the platform 68, has a reversible motor 82 mounted thereon. The motor 82 is connected through a gear train 84 to a shaft 86 whose rear end is rotatably mounted in the bracket 80. The forward end of the shaft 86 is formed into a screw that is threaded into a nut 88 that is secured to the base 74. Rotation of the motor 82 will cause rotation of the shaft 86 and thereby move the base 74 forwardly or rearwardly depending on the direction of rotation of the motor 82.

Figure 12:
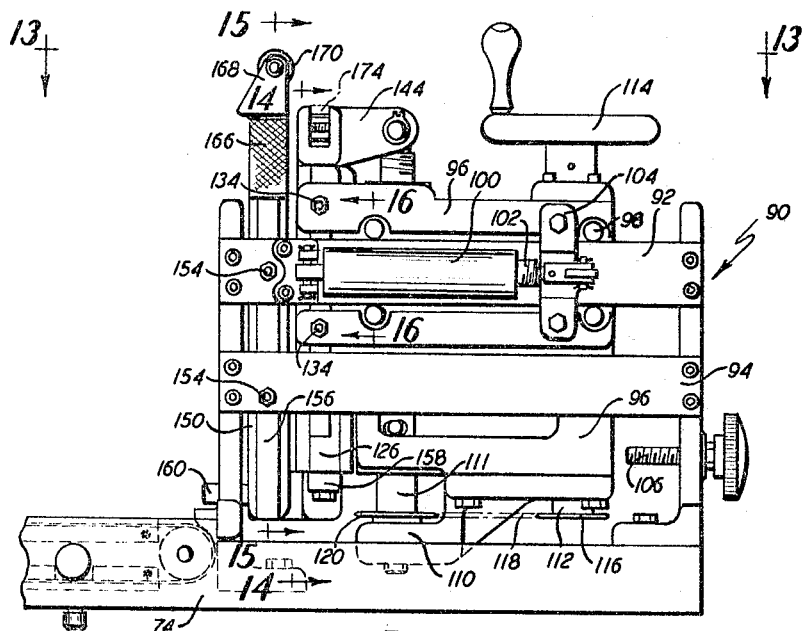
Figure 13:
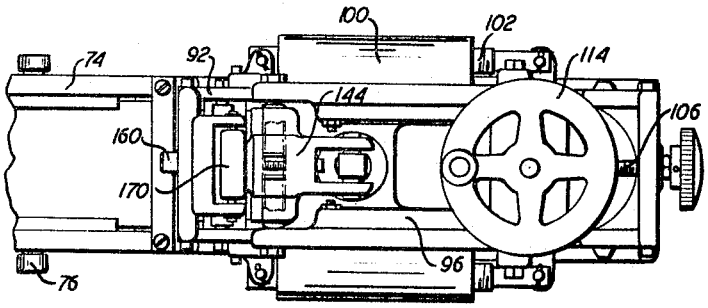

Referring to FIGS. 12 and 13, the front of the base 74 has a framework 90 extending upwardly thereof that includes an upper horizontally extending bar 92 and a lower horizontally extending bar 94 on each side. A horizontal stretch carriage 96, located between the bars 92 and 94 has rollers 98 rotatably mounted thereon that are in engagement with the tops and bottoms of the bars 92 so as to support the carriage 96 on the bars for horizontal movement (FIG. 16). An air actuated motor 100 is pivotally connected to each bar 92, and each motor 100 has a piston rod 102 that is connected to the horizontal stretch carriage 96 by means of a bracket 104. A screw 106, threaded into the framework 90, serves as an adjustable stop to limit the extent of forward movement of the carriage 96 under the influence of the motors 100.

Figure 20:
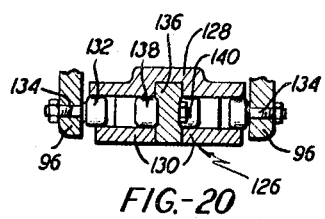
Figures 14, 15:
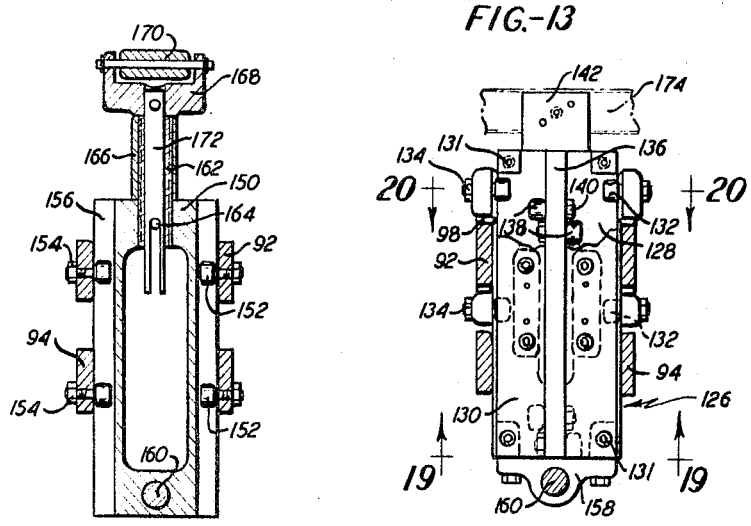

As shown in FIGS. 17 and 18, the carriage 96 includes a pair of vertically spaced flanges 108 and 110 that are separated by a spacer sleeve 111. A shaft 112, rotatably mounted in the carriage 96 (FIG. 12) has a handle 114 secured to its upper end and a sprocket 116 secured to its lower end. The sprocket 116 is connected by way of an endless chain 118 to a sprocket 120 that is rotatably mounted in the flange 110. A stud 122 is threaded into the sprocket 120 and extends upwardly thereof through the sleeve 111 and the flange 108. The top of the stud 122 is pinned to a clevis extension 124 formed on a column 126 (FIG. 19). The column 126 is comprised of a strut 128 and a pair of plates 130 that are secured to the strut at its corners by bolts 131. The strut 128 and the plates 130 define a vertically extending opening that receives rollers 132 that are rotatably mounted on pins 134 (FIGS. 14 and 20). The pins 134 are secured to the carriage 96. The rollers 132 thereby guide the column 126 for vertical movement in the carriage 96. The strut 128 and the plates 130 also define a vertical guideway for a bar 136 that is slidably guided by rollers 138 mounted on pins 140 located in the bar 136 with the rollers 138 extending in the opening between the strut 128 and the plates 130. The top of the bar 136 is formed into a cup 142 (FIG. 17) having a clevis 144 extending forwardly thereof. An air actuated motor 146 is pinned to the clevis 124 to extend upwardly thereof, and the piston rod 148 of the motor 146 is pinned to the clevis 144.

A pillar 150 (FIGS. 12 and 15) is mounted for vertical movement in the framework 90 rearwardly of the column 126 by way of rollers 152 that are rotatably mounted on pins 154 secured to the bars 92 and 94 and that are located in vertical slots 156 formed in the pillar 150. The column 126 has a cap 158 bolted to its bottom and a prong 160 is secured to the cap 158 and extends rearwardly thereof slidably through the bottom of the pillar 150. A hollow nut 162 is threaded into the top of the pillar 150 and is secured thereto by a pin 164. A collar 166 is threaded onto that portion of the nut 162 that rises above the pillar 150, and a bracket 168 rests on the collar 166. A toe rest roller 170 is rotatably mounted on the bracket 168, and the bracket has a downwardly extending shank 172. The shank 172 is forked at its bottom to straddle the pin 164.

As shown in FIGS. 12, 21 and 22, a bar 174 is secured in the cup 142 and extends laterally thereof on both sides. A slide 176 is movably mounted on the bar 174 on each side of the cup 142. The position of each slide 176 on the bar 174 may be adjusted by rotating a stud 178 that is threaded into a nut 180 that is secured to each slide 176. The studs 178 are rotatably mounted in flanges 182 that are secured to the opposite ends of the bar 174, and a handle 184 is affixed to the outer end of each stud 178 to facilitate rotation of the studs.

Each slide 176 has a pincers housing 186 secured thereto. A block 188, secured to each housing 186, has a stationary pincers jaw 190 thereon. A lever 192, that is pivotally connected to each block 188 by means of a pin 194, has a movable pincers jaw 196 thereon. The pincers jaws 190 and 196 form pincers 198. A link 200 is pivoted at its outer end to each lever 192 and the inner end of each link 200 is pivoted to a link 202. Each link 202 is pivoted intermediate its ends to a block 188 and is pivoted at its inner end to a bar 204. The housings 186 each have an air actuated motor 206 mounted thereon, and the piston rod 208 of each motor 206 is secured to a bar 204. Thus an actuation of the motors 206 to raise the bars 204 moves the jaws 196 away from the jaws 190 to open the pincers 198 and an actuation of the motors 206 to lower the bars 204 acts to close the pincers 198.

From the foregoing it can be seen that a rotation of the handle 114 acts to adjust in unison the vertical position of the pincers 198 and the toe rest 170, a manipulation of the collar 166 on the nut 162 acts to adjust the vertical position of the toe rest 170 independently of the pincers 198, an actuation of the motors 100 acts to move the pincers 198 horizontally wih the prong 160 sliding in the pillar 150 and an actuation of the motor 146 acts to move the pincers 198 vertically. The toe rest 170 does not move in response to the actutaion of the motors 100 and 146. Thus the manipulation of the collar 166 serves to adjust the vertical distance between the toe rest 170 and the pincers 198 and the rotation of the handle 114 serves to change the elevation of the toe rest and the pincers while maintaining their vertical distance. It has been found that in adjusting the elevtaion of the toe rest and pincers for the particular style and size of shoe to be subjected to the below described upper stretching operation, it is frequently not necessary to change the vertical distance between the toe rest and the pincers so that this adjustment can be effected merely by rotating the handle 114. Should it prove necessary to also adjust the vertical distance between the toe rest and the pincers, this can be done by manipulating the collar 166.

Figure 8:
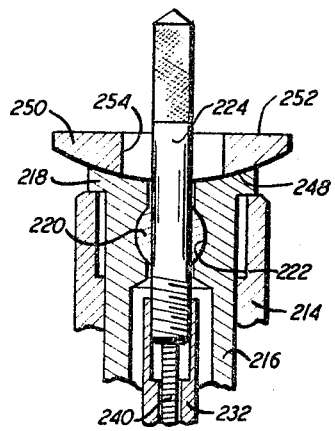
Figure 7:
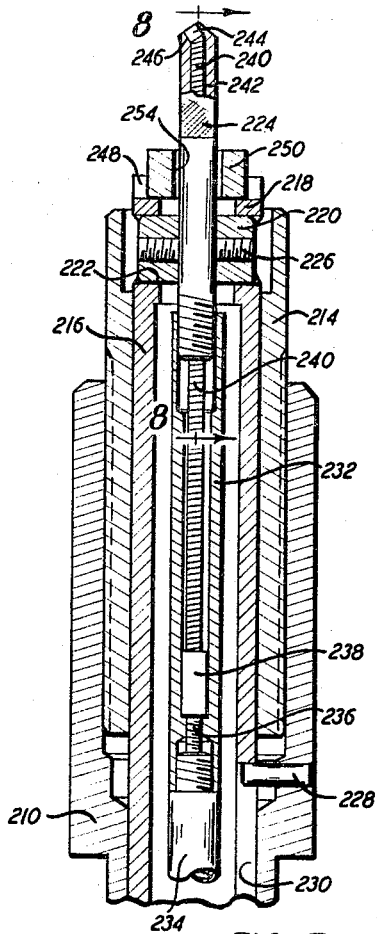
Figure 2:
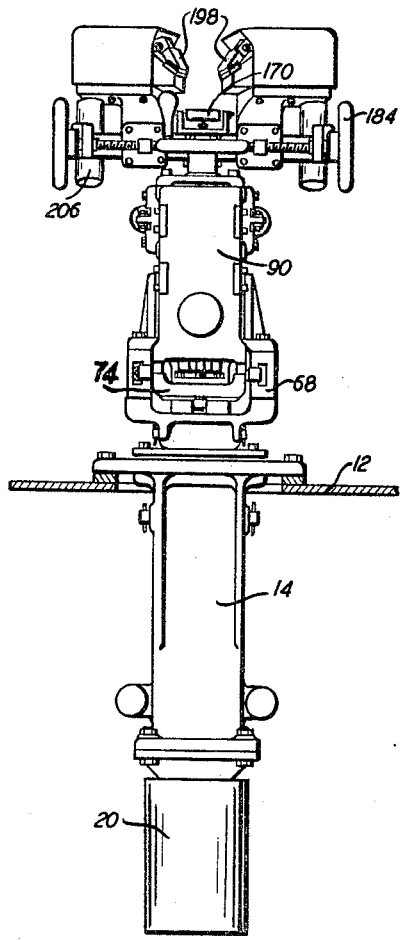
Figure 6:
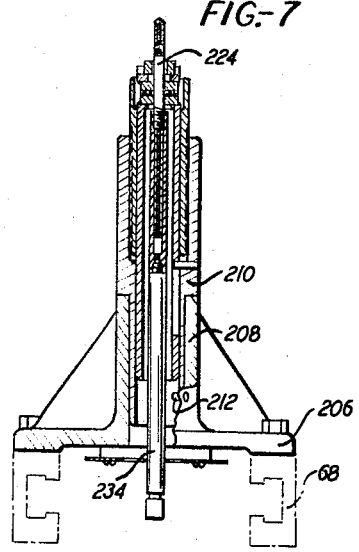
Figure 5:
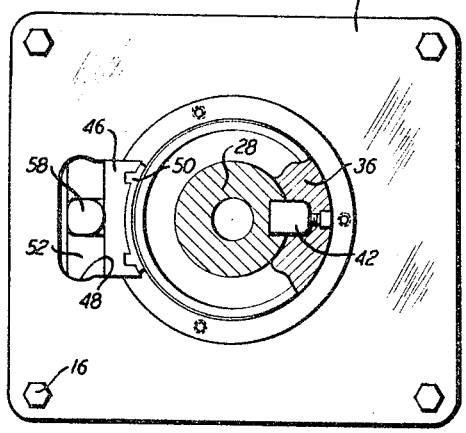

The platform 68, which functions as part of a shoe assembly support, has a base 206 secured thereto (FIGS. 9 and 10). Referring to FIGS. 6–8, the base 206 comprises a hollow tubular portion 208 that rises vertically from the platform 68 on a vertical axis that is forward of the vertical axis of the post 28. A hollow column 210 is seated on the tubular portion 208 and is locked thereto by a pin 212. A hollow sleeve 214 is screwed into the column 210 and extends upwardly thereof. A last pin holding tube 216 is located within the sleeve 214 and is seated on the sleeve by means of shoulders at the top 218 of the tube. A pin 228 fitted into the column 210 extends into a vertical slot 230 in the tube 216. A bar 220 is seated in a pair of radial openings 222 in the tube 216. A last pin 224 extends through a vertical hole in the bar 220 and is secured to the bar by set screws 226. A cylinder 232 is threaded onto the bottom of the last pin 224 and extends within the tube 216. An air actuated spring return motor 234 is threaded onto the bottom of the cylinder 232 and has a piston rod 236 extending upwardly into the cylinder 232. A plunger 238, that is slidable in the cylinder 232, is threaded onto the piston rod 236, and a flexible helical coil 240 is secured, as by soldering, to the plunger 238. The coil 240 extends upwardly from the plunger 238 through the cylinder 232 and a vertical bore 242 in the last pin 224 and terminates in a cap 244 that is secured to the top of the coil. With the plunger 238 and piston rod 236 in the FIG. 7 position, the cap 244 is located in an orifice 246 at the top of the last pin 224 that is inclined from the vertical and communicates with the top of the bore 242.

The tube top 218 has a concave upper surface 248 that receives a shoe assembly supporting plate 250. The plate 250 has a convex lower surface complemental to the tube top surface 248, a flat upper surface 252 and a hole 254 through which the last pin 224 extends. The plate 250 may shift laterally of the tube top 218 and the hole 254 has a larger diameter than the pin 224 to provide the advantages described in pending application Ser. No. 107,156 filed May 2, 1961, now Patent No. 3,189,924, and in Patent No. 3,120,014.

From the foregoing, it can be seen that the elevation of the last pin 224, the shoe assembly supporting plate 250 and the motor 234 may be adjusted by screwing the sleeve 214 within the column 210 with the pin 228 and slot 230 precluding rotation of these parts about the vertical axis of the last pin 224. This adjustment is for the purpose of changing the elevation of the pin 224 and plate 252 according to the size and shape of the shoe assembly to be operated on in the below described operations.

Figure 26:
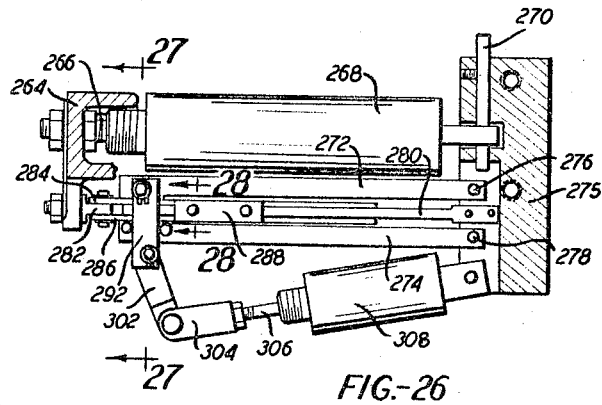
Figure 27:
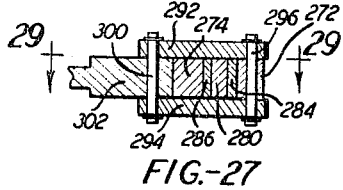
Figure 23:
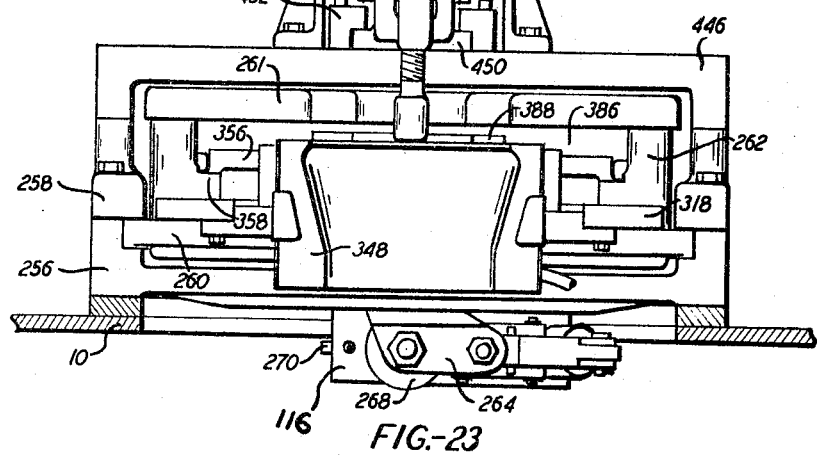
Figure 29:
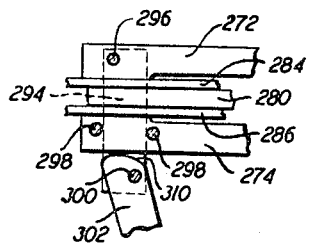
Figure 28:
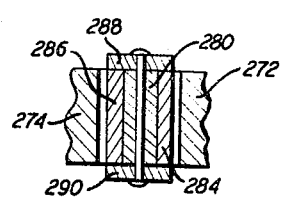

As shown in FIGS. 1 and 23, a head 256 is mounted on the frame 10 rearwardly of the framework 90 and the last pin 224. The head 256 and gibs 258 that are bolted to the head form a guideway that receives a main slide plate 260. A cover 261 is spaced above the plate 260 at its forward end. The cover 261 is connected to the plate 260 by means of spacers 262. The plate 260 has a lug 264 (FIGS. 24 and 26) depending therefrom that is bolted to the piston rod 266 of an air actuated motor 268, and the motor 268 is connected to a hanger 275 depending from the frame 10 by a pin 270. A pair of spaced side struts 272 and 274 are respectively pivoted to the hanger 275 on pins 276 and 278 and extend forwardly of the hanger alongside the motor 268. A center strut 280 is fastened to the hanger 275 between the pins 276 and 278 and extends forwardly between the struts 272 and 274. The lug 264 has a bracket 282 bolted thereto on which a pair of spaced tangs 284 and 286 are pivoted. The tangs extend rearwardly of the lug 264 with the tang 284 located between the struts 272 and 280 and the tang 286 located between the struts 274 and 280. A pair of plates 288 and 290 are secured to the center strut 280 and respectively overlie and underlie the tangs 284 and 286 to maintain the tangs at the same level as the strut 280 (FIG. 28). A pair of straps 292 and 294 are respectively pivoted at their inner ends to the top and bottom of the forward end of the side strut 272 by a pin 296 (FIG. 27). The straps extend laterally of the struts 280 and 274 and the tangs 284 and 286 between spaced abutments 298 that are located on the strut 274 (FIG. 29). The outer ends of the straps 292 and 294 are pivotally connected by a pin 300 to a link 302. The link 302 is pivoted to a limb 304 that is secured to the piston rod 306 of an air actuated motor 308 (FIG. 26). The motor 308 is pivoted to the hanger 275. The link 302 has a cam surface 310 that is eccentric with respect to the axis of the pin 300.

From the foregoing it can be seen that an actuation of the motor 308 to project the piston rod 306 out of the motor in a leftward direction as seen in FIG. 26 will swing the link 302 clockwise (FIGS. 26 and 29) about the axis of the pin 300 and cause the cam surface 310 to jam the struts 272, 280 and 274 and the tangs 284 and 286 against each other. A retraction of the piston rod 306 into the motor 308 causes the link 302 to swing counterclockwise and thus free the tangs to slide between the struts.

Figure 25:
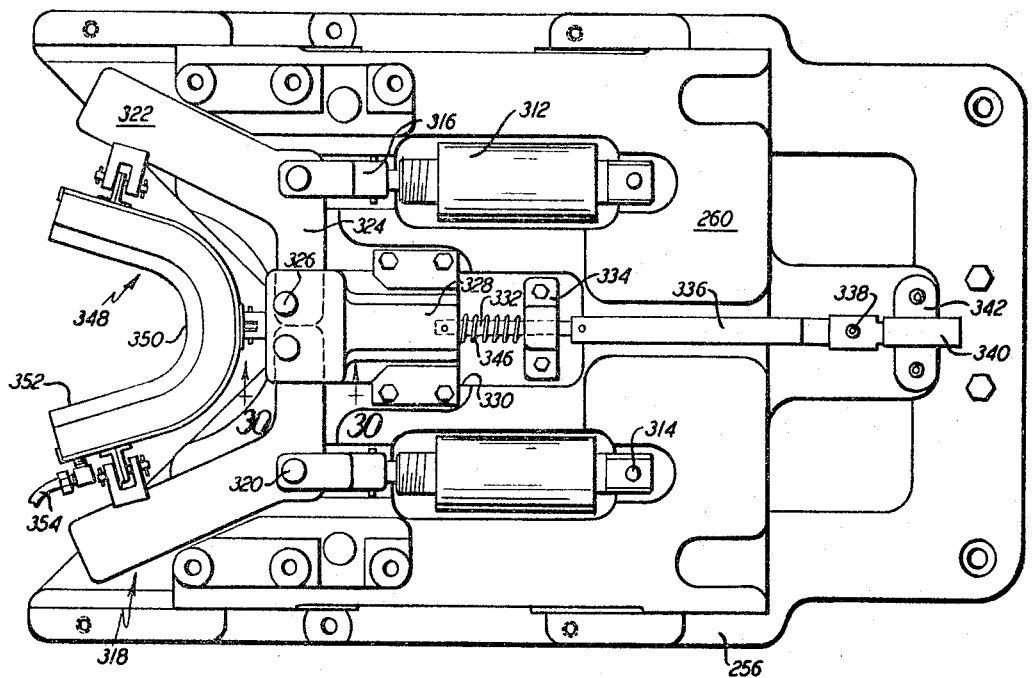
Figure 24:
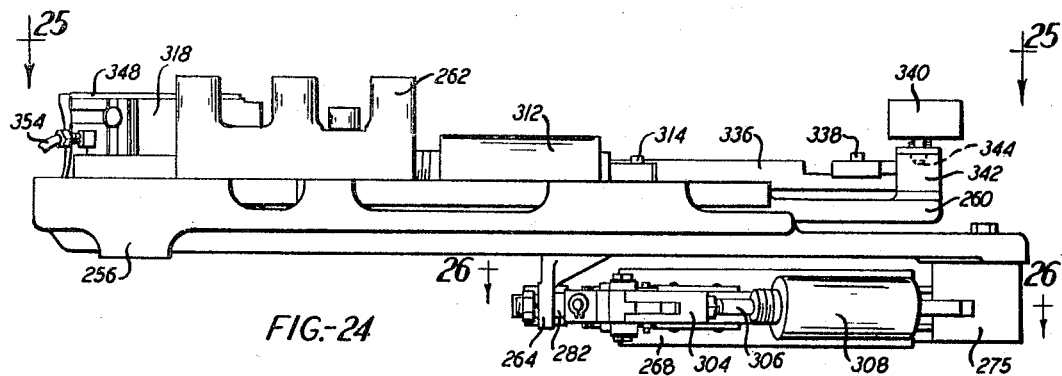
Figure 30:
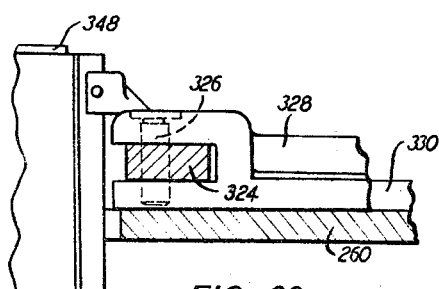

As shown in FIG. 25, a pair of air actuated motors 312 are swingably mounted on the plate 260 on pivot pins 314. Each motor 312 has a piston rod 316 that is pivotally connected to a lever 318 by a pivot 320. The levers 318 have legs 322 extending forwardly and divergently from the pivots 320 and legs 324 extending toward each other from the pivots 320. The legs 324 are pivotally connected by pivots 326 to a slide beam 328. The beam 328 is slidably mounted between walls 330 formed in the slide plate 260 (FIG. 30). A rod 332 is pinned to the beam 328 and extends rearwardly thereof through a bracket 334 that is bolted to the side plate 260 (FIG. 25). The rear end of the rod 332 is secured to a bar 336 that is slidably guided in the slide plate 260 and a valve actuator 338 is located at the rear end of the bar 336 (FIG. 24). A valve 340, mounted on a housing 342 secured to the rear end of the slide plate 260, has a valve stem 344 depending therefrom that is in alignment with the valve actuator 338. A compression spring 346 coiled about the rod 332 between the beam 328 and the bracket 334 yieldably urges the beam forwardly to a position where the contiguous surfaces of the lever legs 324 abut each other pursuant to the swinging of the levers about the pivots 326.

A U-shaped clamping pad 348 is provided that is made of an expandable, deformable material such as rubber (FIGS. 24, 25 and 30). The pad 348 has a bight 350 and a pair of legs 352 extending forwardly of the bight. The pad, which is constructed similarly to that shown in pending application Ser. No. 262,874 filed Mar. 5, 1963, now Patent No. 3,228,046, has a cavity 353 (FIG. 48A) into which pressurized fluid such as air may be forced by way of a line 354 to expand the inner walls of the pad for reasons described below. The bight 350 of the pad 348 is connected to the beam 328 and the legs of the pad are each connected to a lever leg 322 by means such as that disclosed in the forementioned application Ser. No. 262,874.

Figure 31:
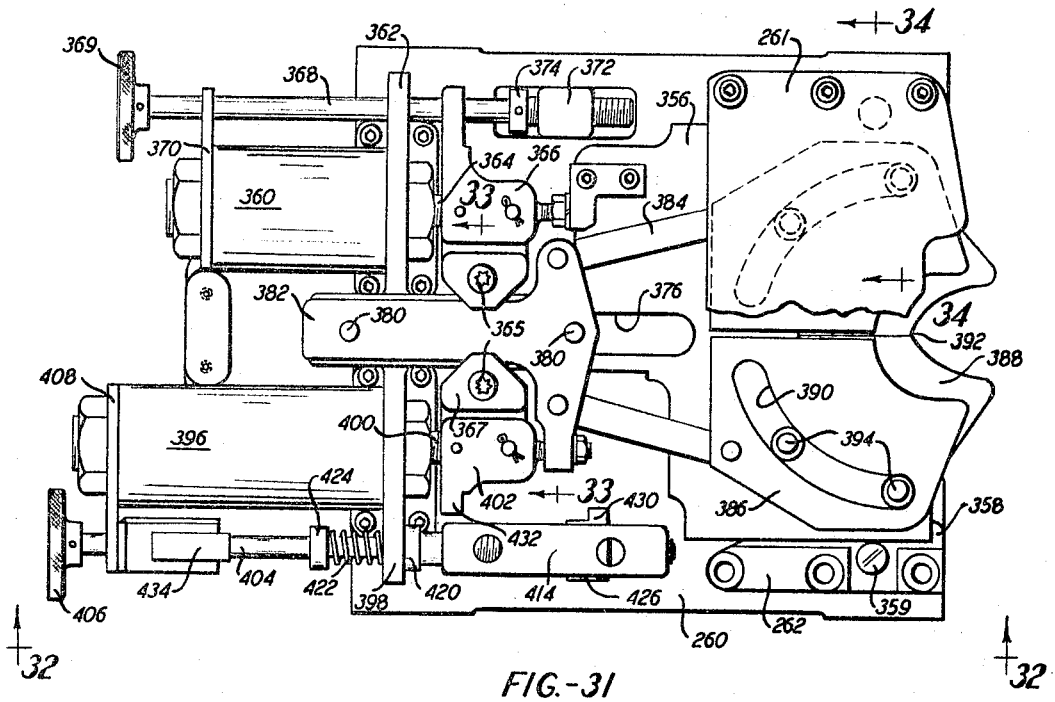
Figure 32:
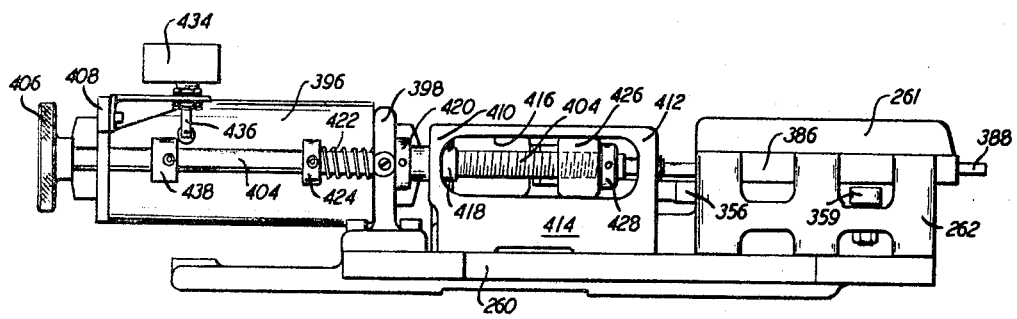
Figure 33:
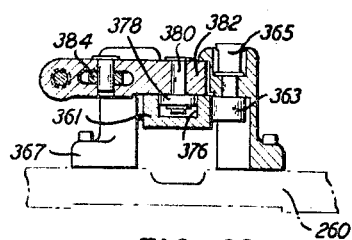
Figure 34:
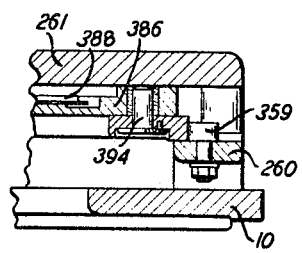

The machine incorporates wipers and wiper driving means that are similar to those disclosed in the aforementioned application Ser. No. 294,351 filed July 11, 1963. Referring to FIGS. 23, 31 and 32, a wiper supporting slide plate 356 is slidably mounted for forward and rearward movement on shoulders 358 on the spacers 262 above the main slide plate 260. Rollers 359 (FIG. 34) on the plate 260 guide the plate 356 in its movements. A relatively narrow neck 361 (FIG. 33) at the rear of the plate 356 is guided by engagement with a pair of rollers 363 that are rotatably mounted on pins 365. The pins 365 are mounted in columns 367, and the columns are affixed to the plate 260. An air operated motor 360 is secured to a rib 362 on the main slide plate 260. The piston rod 364 of the motor 360 is connected to the plate 356 by way of a coupling 366. A stud 368, having a handle 369 at its rear end, extends through holes in a tongue 370 secured to the motor 360, the rib 362 and the coupling 366 and is threaded into a boss 372 that is up- standing from the main slide plate 260. A stop ring 374 is pinned to the stud 368 between the connector 366 and the boss 372. The plate 356 has a slot 376 extending along its center line that receives a pair of rollers 378 (FIG. 33) rotatably mounted on pins 380 that are mounted on a drive rod 382. Links 384 are pivoted to the forward end of the rod 382. The opposite ends of the links 384 are pivoted to wiper cams 386 and a wiper 388 is mounted in each wiper cam. The wiper cams 386, which are located immediately below the cover 261, and rest on the plate 356 have curved cam slots 390 with a center of curvature at the bight where the wipers diverge from each other, indicated by numeral 392 in FIG. 31 and hereinafter referred to as the vertex of the wipers. The plate 356 has rollers 394 extending upwardly therefrom into the cam slots 390. An air actuated motor 396, secured to a rib 398 on the main slide plate 260, has a piston rod 400 that is connected to the rod 382 by a coupling 402. A stud 404, having a handle 406 at its rear end, extends through openings in a tongue 408 secured to the motor 396 and the rib 398. Forwardly of the rib 398, the stud 404 extends through the rear wall 410 and the front wall 412 of a housing 414 that is secured to the plate 260. The housing has a cut-out 416 between its walls 410 and 412 that is straddled by the stud 404. A bushing 418, that is pinned to the stud 404, is slidably mounted in an opening in the housing wall 410. The rear of the bushing has a flange 420 that normally bears against the rib 398. A compression spring 422, interposed between the rib 398 and a collar 424 pinned to the stud 404, is coiled about the stud and serves to yieldably urge the flange 420 against the rib 398. A stop 426 is threaded on the stud 404 within the cut-out 416 and is restrained against rotation about the axis of the stud by its top and bottom engaging the top and bottom walls of the cut-out. Rotation of the handle 406 serves to adjust the position of the stop within the cut-out 416 and a collar 428 pinned to the stud serves to limit the forwardmost position of the stop on the stud. The stop 426 has a lug 430 that is in alignment with a lug 432 on the coupling 402. A valve 434, mounted on the tongue 408, has a valve stem 436 that is in alignment with and normally located forwardly of a collar 438 that is pinned to the stud 404. The location of the collar 438 on the stud may be adjusted for the reasons given below.

Figures 35, 36:
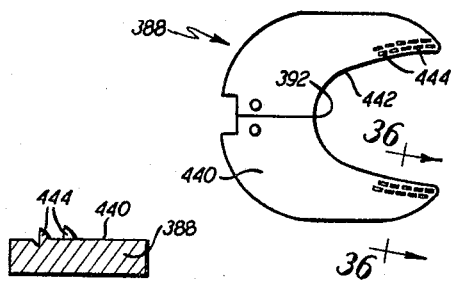

The wipers 388, which are of substantially the same construction as the wipers disclosed in the aforementioned application Ser. No. 294,351, are substantially flat plates having smooth coplanar undersurfaces 440 and side surfaces 442 that diverge forwardly from the vertex 392. As shown in FIGS. 35 and 36, the wiper undersurface 440 adjacent the side surfaces 442 in the region furthermost from the vertex 392 have a plurality of downwardly extending sharp prongs 444.

Figure 37:
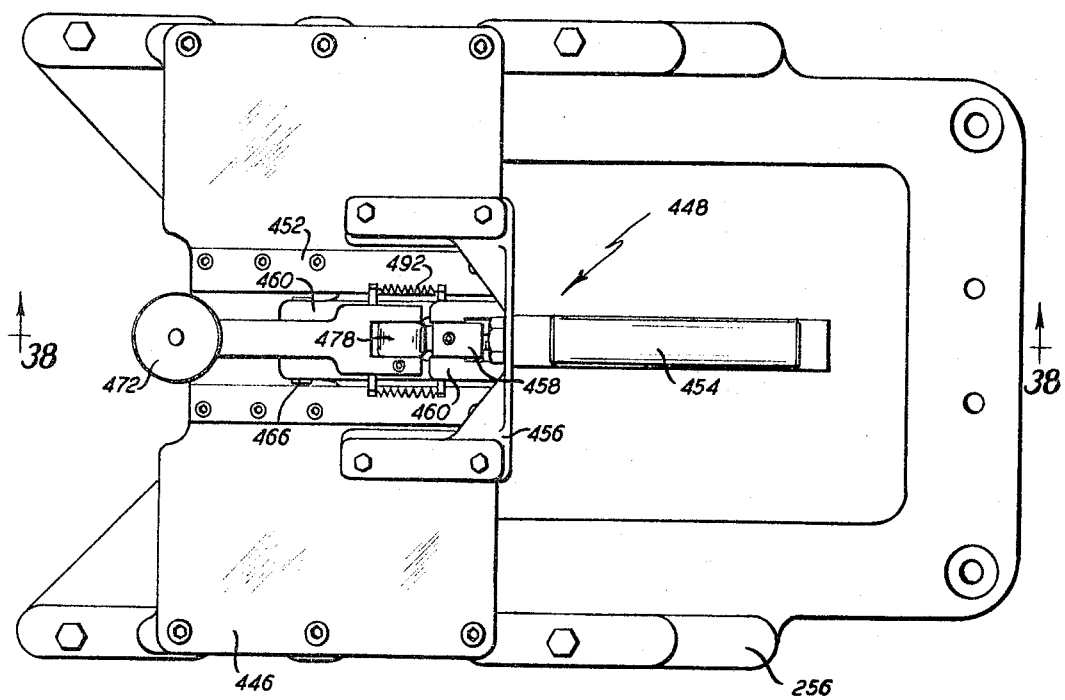
Figure 38:
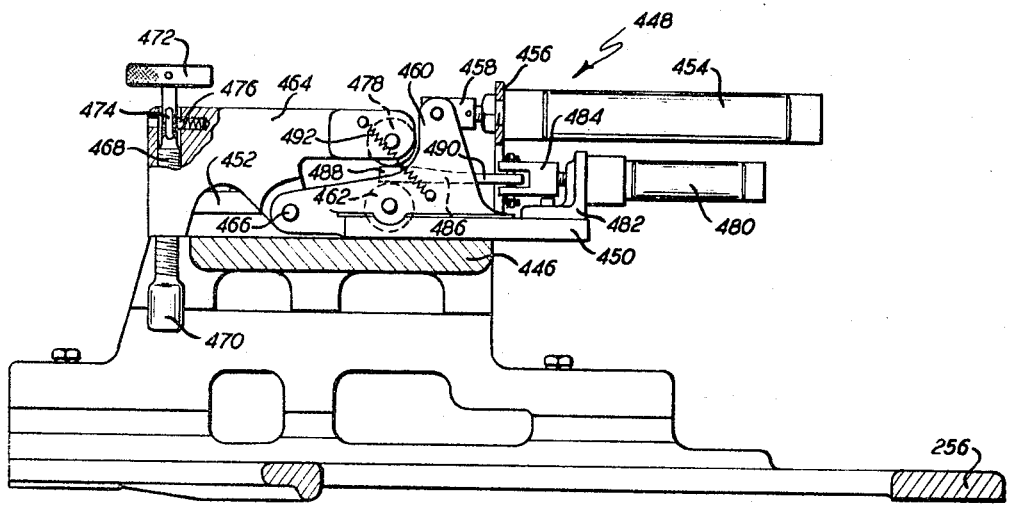

As shown in FIGS. 37 and 38, the aforementioned head 256 has a cover 446 that overlies the cover 261 and supports a hold-down unit 448. The hold-down unit includes a slide 450 that is constrained for forward and rearward movement on the cover 446 by gibs 452 bolted to the cover. An air operated motor 454 is mounted on a flange 456 that is secured to the cover 446. The piston rod 458 of the motor 454 is located between and pivoted to a pair of walls 460 that are upstanding from the slide 450. A lower roller 462 is rotatably mounted between the walls 460 and a hold-down holder 464 is pivotally mounted between the forward ends of the walls 460 by means of a pivot pin 466. A hold-down 468, having a hold-down foot 470 at its bottom, is threaded into the holder 464. The hold-down 468 has a handle 472 at its top and a plurality of radial recesses 474 that are engageable by a spring urged detent 476 located in the holder 464, whereby the vertical position of the foot 470 may be adjusted by manipulating the handle 472 and the foot may be locked in adjusted position by the detent 476 entering into a selected recess 474. A roller 478 is rotatably mounted on the rear of the holder 464 and is located above the roller 462. An air operated spring return motor 480 is mounted in a flange 482 that is secured to the slide 450. The piston rod 484 of the motor 480 has a cam 486 secured thereto that is interposed between the rollers 462 and 478. The cam 486, which is constructed similarly to the corresponding cam disclosed in the aforementioned pending application Ser. No. 107,156, now Patent No. 3,189,924, and in pending application Ser. No. 214,311 filed Aug. 2, 1962, now Patent No. 3,149,354, has a high portion 488 that is normally interposed between the rollers 462 and 478 and a low portion 490 that is brought between the rollers in response to leftward movement (FIG. 38) of the piston rod 484 in response to actuation of the motor 480. A pair of tension springs 492 extending between the walls 460 and the holder 464 yieldably urges the roller 478 against the cam so that the presentation of the low cam portion 490 between the rollers 462 and 478 will enable the springs 492 to swing the holder 464 clockwise (FIG. 38) about the axis of the pin 466 and thereby raise the hold-down foot 470.

Referring to FIGS. 1, 39 and 40, the frame 10 includes a base 494 having trunnions 496 bolted thereto. A control pedal 498 is pivotally mounted in the trunnions 496. The pedal has a platform 500 at its forward end that can be stepped on by the operator and a boss 502 at its rear end. A housing 504, secured to the base 494, has a plate 506 slidably mounted therein above the boss 502. The plate 506 is yieldably urged downwardly to the FIG. 39 position by a tension spring 508 extending between a cap 510 on top of the plate 506 and the base 494. A pair of valves 512 and 514 are mounted in the housing 504. A shoulder 516 on the plate 506 is in alignment with the valve stem of the valve 512, and a shoulder 518 on the plate 506 is in alignment with the valve stem of the valve 514. The valves 512 and 514 are positioned at the same elevation, but the shoulder 516 is at a higher elevation than the shoulder 518. A stop member in the form of a bolt 520, extending downwardly through the housing 504 above the pedal 498, has a compression spring 522 interposed between the bolt head 524 and the housing 504 whereby the bolt is yieldably urged downwardly to a position determined by a nut 526 threaded onto the stud and engaging the top of the housing. A stud 528 is threaded into the housing to extend downwardly thereof an amount determined by a lock nut 530. A bracket 532, mounted on the housing 504, has a valve 534 mounted thereon that has a downwardly directed valve stem 536 that is yieldably urged downwardly by a compression spring 538. The valve stem 536 is in alignment with the cap 510. An air actuated motor 540, mounted on the pedal 498, has a downwardly directed piston rod 542. The piston rod 542 has a button 544 thereon that bears against the base 494.

In setting up the machine for a particular size of shoe and last, the aforementioned adjustments of the various machine parts are made. In the idle condition of the machine, the piston rod 22 is retracted into the motor 20 to maintain the last pin 224, the shoe assembly supporting plate 250, the pincers 198 and the toe rest 170 in a lowered position, the piston rods 102 are retracted into the motors 100 to maintain the carriage 96 in a rearward position, the piston rod 148 is retracted into the motor 146 to maintain the pincers 198 in a lowered position with respect to the carriage 96, the piston rods 208 are projected out of the motor 206 to maintain the pincers 198 open, the piston rod 236 is retracted into the motor 234 to maintain the cap 244 in the orifice 246, the piston rod 266 is retracted into the motor 268 to maintain the main slide plate 260 in a rearward position, the piston rod 306 is retracted into the motor 308 to enable the tangs 284 and 286 to be slidable between the struts 272, 280 and 274, the piston rods 316 are retracted into the motors 312 to maintain the pad 348 in an open position with the lever legs 324 swung rearwardly about the pivots 326 and abutting each other, there is no pressurized fluid in the line 354 so that the pad 348 is deflated, the piston rod 364 is retracted into the motor 360 so that the wiper supporting slide plate 356 is in a rearward position with respect to the main slide plate 260, the piston rod 400 is retracted into the motor 396 so that the wipers 388 are maintained in an open position, the piston rod 458 is retracted into the motor 454 so that the slide 450 and the hold-down 468 are in a rearward out-of-the-way position, the piston rod 484 is retracted into the motor 480 so that the cam portion 488 is presented between the rollers 462 and 478 and the hold-down 468 is in a relatively lowered position, and the piston rod 542 is retracted into the motor 540 so that the pedal 498 and the plate 506 are maintained in the FIG. 39 position.

Although the machine has general utility in stretching an upper over a last and wiping the heel of the upper against an insole, it is herein disclosed as performing the method disclosed in pending application Ser. No. 80,919 filed Jan. 5, 1961, now Patent No. 3,144,670, wherein the heat-softenable counter disclosed in said application and in application Ser. No. 134,641 filed Aug. 29, 1961, now abandoned, is utilized.

Figure 41:
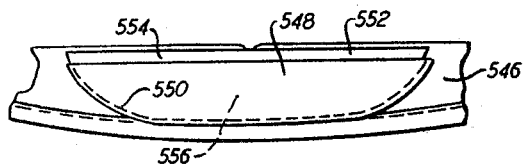

As shown in FIG. 41, a shoe upper 546 is provided having a liner 548 united thereto by a seam 550 at the heel end of the upper. A shoe stiffener or counter 552 is inserted in the pocket formed between the upper 546 and the liner 548 with an exposed portion 554 of the counter extending upwardly of the upper edge of the liner and a concealed portion 556 lying between the liner and the upper. The counter material is made of a homogeneous-thermoplastic material and has the characteristic of being stiff and rigid at ambient temperatures, of becoming soft and flaccid when heated above a predetermined temperature and of reverting to its stiff and rigid state when cooled back below the predetermined temperature to ambient temperatures. The counter is coated on both of its surfaces with a thermoplastic adhesive which becomes sticky or tacky when heated above said predetermined temperature and reverts to its normal rigid, cohesive condition when cooled below the predetermined temperature back to ambient temperatures.

Figure 47:
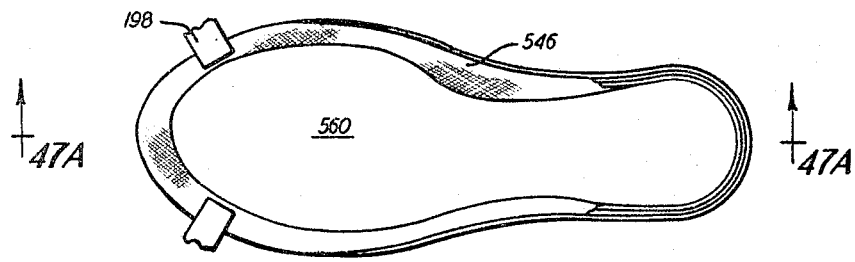
FIG. 47 is a top view of the shoe assembly after it has been placed in the machine and the forepart portions of the upper margin have been gripped by the pincers.
Figure 47A:
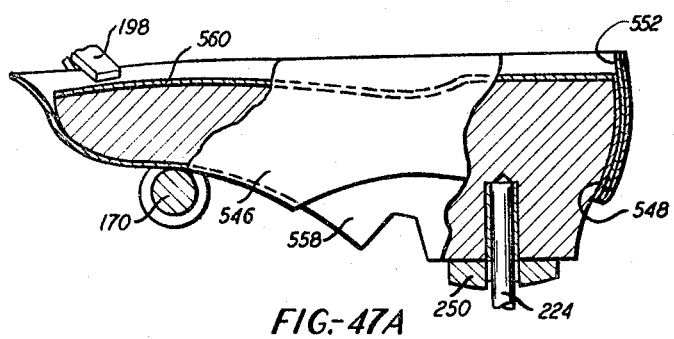
FIG. 47A is a view taken on the line 47A—47A of FIG. 47.

The counter, upper and liner assembly is heated to a temperature sufficient to render the counter soft and flaccid. This may be done in apparatus similar to that disclosed in Patent No. 3,115,651. This assembly is then draped about a last 558 (FIGS. 47 and 47A) having an insole 560 mounted on its bottom to form a shoe assembly. The shoe assembly is placed bottom-up on the shoe assembly supporting plate 250 with the last pin 224 entering the conventional last pin hole in the last. The toe portion of the upper and last is supported on the toe rest roller 170 and the forepart portions of the upper margin are inserted between the jaws of the pincers 198. At this time the upper end of the liner 548 is substantially level with the insole 560 and the upper surfaces of the counter 552 and upper 546 at the heel end of the last extend above the insole 560 as indicated in FIG. 47A.

The operator now depresses the pedal platform 500 an amount sufficient to cause the shoulder 516 on the plate 506 to shift the valve 512. Through a pneumatic control circuit (not shown), closure of the valve 512 causes the motors 206 to be actuated to close the pincers 198 and cause them to grip the forepart portions of the upper margin and bring the parts to the position shown in FIGS. 47 and 47A. At this point the operator may inspect the work to see if the pincers 198 are properly gripping the upper margin. If they are not, he may release the pedal 498 to thereby return the valve 512 to its idle position and cause the pincers to open. If the upper margin is being properly gripped by the pincers 198 the operator further depresses the platform 500 an amount sufficient to cause the shoulder 518 on the plate 506 to shift the valve 514 while the valve 512 remains shifted. The bolt head 524 is so located as to be engaged by the pedal 498 at the time the shoulder 518 shifts the valve 514 so that the operator can feel when the valve 514 is shifted by the resistance to movement of the pedal offered by the spring 522. The shifting of the valve 514 causes pressurized air to actuate the motors 100 to move the carriage 96 together with the pincers 198 forwardly to thereby horizontally stretch the upper in the direction of the toe of the last and cause a firm wrapping of the upper about the heel of the last and a tension force on the counter to start to mold it to the shape of the last. At this point the operator may again inspect the work and release the pedal and return the parts to their original position if the upper is not being properly engaged by the pincers 198 and stretched about the heel of the last.

The operator, assuming he is satisfied with the condition of the work in the machine, now steps further on the platform 500 against the force of the spring 522 to cause the cap 510 of the plate 506 to shift the valve spool 536 while the valves 512 and 514 remain shifted. The stud 528 is so positioned as to stop the movement of the pedal 498 when the valve spool 536 has been shifted an amount sufficient to enable the succeeding operations to take place.

In response to shifting of the valve spool 536, the motor 540 is actuated to force the button 544 against the base 494 and thus maintain the left end of the pedal 498 (FIG. 39) in raised position with the valves 512, 514 and 534 shifted through the rest of the machine cycle so that the operator may now take his foot off the platform 500. At the same time the motor 454 is actuated to move the hold-down 468 forwardly from its out-of-the-way position to a working position above the shoe and last bottom. Prior to this time in the machine cycle, the hold-down had been in its rearward out-of-the-way position so as not to interfere with the placement of the shoe assembly on the last pin 224 and also to not interfere with the operator's observing whether the upper was properly gripped by the pincers 198 and whether the upper was properly stretched about the heel of the last as a result of the forward horizontal stretching movement of the pincers.

Now the motor 20 is actuated to raise the post 28 together with the last pin 224, last supporting plate 250, toe rest 170 and pincers 198 until the insole 560 bears against the hold-down foot 470. The elevation of the hold-down 468 had been adjusted to position the bottom of the hold-down foot 470 slightly below the level of the wiper undersurfaces 440 so that the raising of the shoe assembly by the actuation of the motor 20 brings the insole to this level regardless of the height of the last or the thickness of the insole and clamps the shoe assembly between the plate 250 and the hold-down foot 470.

Figures 48, 48A:
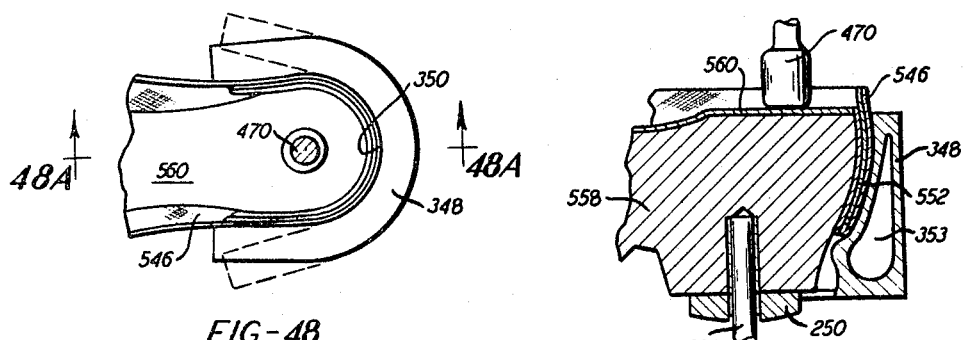
FIG. 48 is a top view of the shoe assembly when it is engaged by the heel clamp.
FIG. 48A is a view taken on the line 48A—48A of FIG. 48.
Figure 42:
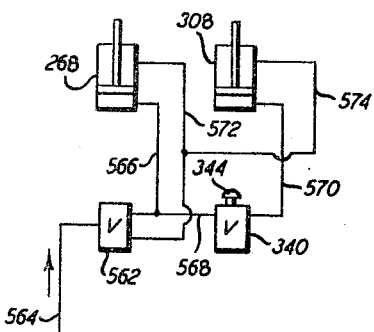
FIG. 42 is a schematic representation of that portion of the machine control circuit that operates to lock the plate in position.

After this, a valve 562 (FIG. 42) in the control system is shifted to cause pressurized air to pass from the source through a line 564, the valve 562 and a line 566 to the motor 268 to cause the motor 268 to move the main slide plate 260 forwardly and thereby move the clamping pad 348 and wipers 388 forwardly from their out-of-the-way position until the bight 350 of the pad 348 engages the heel end extremity of the shoe assembly as shown in dotted lines in FIG. 48. The engagement of the pad bight with the shoe assembly causes the beam 328, rod 332 and bar 336 to move rearwardly with respect to the plate 260 until the valve actuator 338 shifts the valve stem 344 of the valve 340. The shifting of the valve stem 344 causes pressurized air to pass from the valve 562, through a line 568, the valve 340 and a line 570 to the motor 308 to actuate this motor to jam the struts 272, 280 and 274 and the tanks 284 and 286 against each other and thus stop the forward motion of the slide plate 260 and lock the slide plate in position. Prior to the shifting of the valve 562 pressurized air had passed from the valve 562 through a line 572 to the motor 268 to cause this motor to maintain the slide plate 260 in its rearward position and had passed from the valve 562 through a line 574 to the motor 308 to maintain the motor 308 in a condition that enabled the tangs 284 and 286 to be slidable between the struts 272, 280 and 274. During the rearward movement of the beam 328 the levers legs 322 swing inwardly to some extent about the pivots 326 but not enough to cause any substantial engagement of the pad legs 352 with the shoe assembly.

The main slide plate had been maintained in its retracted out-of-the-way position up to this time so as to enable the operator to inspect the shoe assembly during the gripping of the upper margin by the pincers 198 and the horizontal stretching movement of the pincers without interference by the heel clamp 348 and the wipers 388. In addition, the maintenance of the heel clamp and the wipers in their out-of-the-way position enables the motor 20 to raise the shoe assembly without interference with the heel clamp and wipers. By having the forward movement of the main slide plate 260 terminated and the plate locked in position in response to engagement of the bight of the heel clamp with the heel end of the shoe assembly, it is assured that the heel clamp and wipers will be positioned adjacent the shoe assembly for the subsequently performed heel clamping and wiping operation regardless of the location of the heel end of the shoe assembly.

After the locking of the main slide plate 260, the motor 146 is actuated to move the pincers 198 vertically and thus apply an upward tension to the upper margin at its forepart portions to thereby stretch the upper tightly on the last and assemble it in proper position for the subsequent heel seat lasting operation. Since the shoe assembly is clamped at this time between the last supporting plate 250 and the hold-down foot 470, upward movement of the pincers will not shift the last 558.

The motors 312 are now actuated to cause the piston rods 316 to swing the levers 322 about the axis of the pivots 326 to thereby move the pad 348 from the dotted to the solid line position of FIG. 48 and cause all of the inner wall of the pad to engage the heel of the shoe assembly. Concomitantly with the actuation of the motors 312, pressurized fluid (preferably air) is caused to enter the pad cavity 353 through the line 354 to expand the inner wall of the pad 348 against the shoe assembly. The clamping pad 348 acts to provide a compression molding force on the counter to further mold it to the shape of the last as well as clamping the upper for the subsequent wiping operation. By having the bight 350 of the pad 348 engage the shoe assembly and following this with a progressive engagement of the pad legs 352 with the shoe assembly, there is provided an initial contact of the pad at the heel end of the shoe assembly and then a progressive engagement of the pad along the sides of the shoe assembly extending forwardly of the heel to ensure a smoothening out of any wrinkles there may be in the upper and a smooth firm clamping of the upper against the last. The parts now assume the position shown in FIGS. 48 and 48A.

Figure 49:
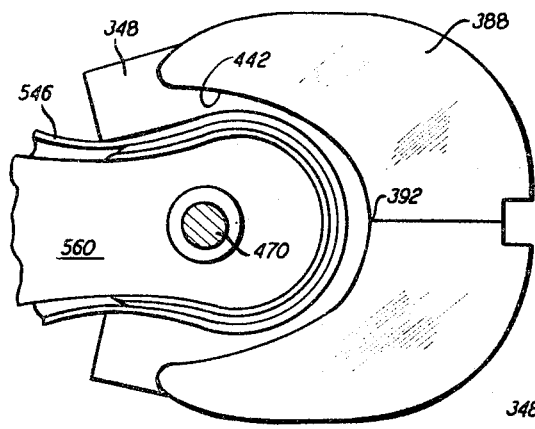
FIG. 49 is a top view of the shoe assembly after it has been clamped by the heel clamp and before the wipers begin their translatory movement.

After the heel of the shoe assembly is clamped by the inflated clamping pad 348, the motor 360 is actuated to move the piston rod 364 forwardly. This causes the wiper supporting slide plate 356 to move forwardly until the coupling 366 strikes the stop ring 374. For the reasons given below, the wipers 388 do not have any movement relative to the plate 356 during the forward movement of the plate. As a result the wipers are translated forwardly from the FIG. 49 to the FIG. 50 position without moving inwardly of the vertex 392 so that only the bight of the wiper side surfaces 442 at and adjacent the vertex 392 cross over the last to wipe the upper and counter margins at and adjacent the heel of the last down upon the insole, and the forwardmost portions of the wiper side surfaces 442 and the prongs 444 do not engage the upper.

Figure 43:
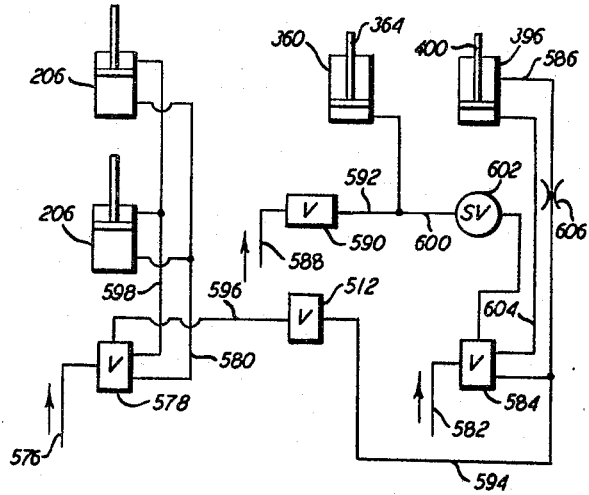
FIG. 43 is a schematic representation of that portion of the machine control circuit that enables the forepart pincers to release their grip on the upper margin concomitantly with the inward swinging movement of the wipers.

Referring to FIG. 43, in the idle condition of the machine, the pincers 198 are kept open by pressurized air passing from the source through a line 576, a valve 578 and a line 580 to the motors 206. The wipers 388 are kept in their retracted position in the idle condition of the machine by pressurized air passing from the source through a line 582, a valve 584 and a line 586 to the motor 396 to force the piston rod 400 rearwardly. At this time the presssurized air which during the machine cycle enters the motor 360 from the source through a line 588, a valve 590 and a line 592 is blocked at the valve 590. Therefore when the wipers 388 have completed their opening movement about the vertex 392 in response to the air entering the motor 396 through the line 586 and the forward end of the cam slots 390 engage the forwardmost rollers 394, the continued rearward movement of the piston rod 400 causes the plate 356 to be moved rearwardly and the piston rod 364 to be retracted into the motor 360. The pincers 198 had been closed at the beginning of the machine cycle in response to shifting of the valve 512 by pressurized air passing from the valve 584 through a line 594, the valve 512 and a pilot line 596 to the valve 578 to shift the valve 578 and thereby vent the lines 580 and cause pressurized air to pass to the motors 206 from the valve 578 through a line 598. The motor 360 had been actuated to move the plate 356 forwardly in response to shifting of the valve 590 in the machine cycle to enable pressurized air to enter the motor 360 through the line 592. Initially there is a resistance to forward movement of the piston rod 364 of the motor 360 due to air entering the motor 396 through the line 586 and forcing the piston rod 400 of the motor 396 rearwardly. This resistance causes pressurized air to pass from the line 592 into a line 600, pass through a sequence valve 602 which is normally closed and opens in response to the build-up of a predetermined pressure, and shift the valve 584. The shifting of the valve 584 vents the lines 586, 594 and 596 and causes pressurized air to enter the motor 396 from the valve 584 through a line 604. The venting of the lines 594 and 596 enables the valve 578 to return to its original position and cause pressurized air to again enter the motors 206 through the lines 580 and thus open the pincers 198. The concurrent venting of the line 586 and pressurizing of the line 604 enables the piston rod 400 of the motor to be moved forwardly. However, the forward movement of the piston rod 400 is retarded due to a restrictor valve 606 in the line 586 that slows the egress of pressurized air from the motor 396 through the line 586. The piston rod 400 is therefore dragged forwardly during the forward movement of the piston rod 364 at a speed that is no faster than the forward speed of the piston rod 364. After the forward movement of the piston rod 364 is terminated by the engagement of the coupling 366 with the stop ring 374, the continued forward movement of the piston rod 400 causes the drive rod 382 and the links 384 to move forwardly and the rollers 394 to move with respect to the slots 390 and thereby cause inward swinging movement of the wipers 388 about the vertex 392 with no forward translatory movement of the wipers. The time lags in the control system are such that the pincers 198 open to release the heretofore gripped forepart portions of the upper margin substantially at the time that the wipers commence their inward swinging movement and engage the upper margin.

Figure 50:
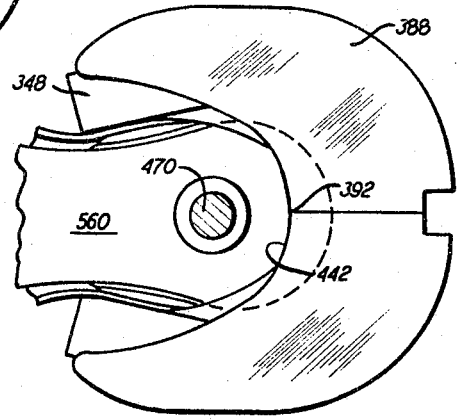
FIG. 50 is a top view of the shoe assembly after the wipers have completed their translatory movement.
Figure 51A:
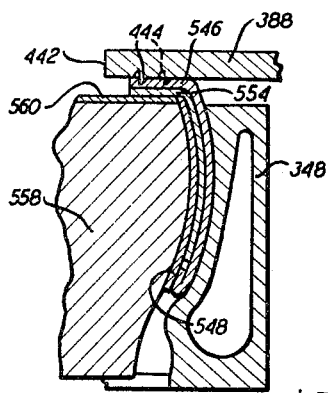
FIG. 51A is a view taken on the line 51A—51A of FIG. 51.
Figure 51:
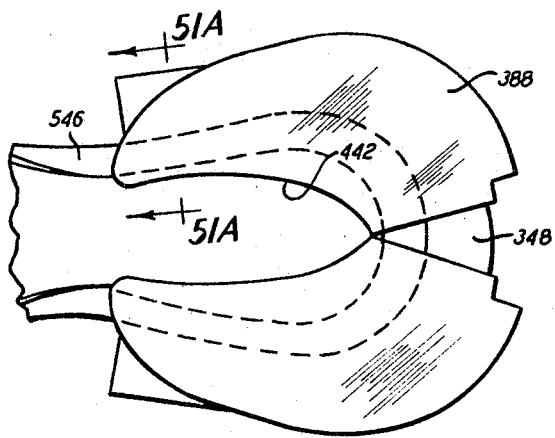
FIG. 51 is a top view of the shoe assembly after the wipers have completed their inward movement.

The inward swinging movement of the wipers 388 from the FIG. 50 to the FIG. 51 position, after the completion of the forward translatory movement of the wipers, causes the forwardmost portions of the wiper side surfaces 442 and the prongs 444 to cross over the last to wipe the upper and counter margins upon the insole between the general area of the breastlines of the upper and the portion of the upper engaged by the wipers during the translation of the wipers. During the inward swinging movement of the wipers the prongs 444 impale themselves on the upper margin in the general area of the breastlines to drag and stretch the upper margins inwardly towards the center line of the last and to also stretch the heightwise reaches of the upper margin located between the last 553 and the clamping pad 348 (see FIG. 51A). The clamping pressure of the pad against the last is sufficiently low so that this stretching can take place. When the upper has been stretched to the utmost by the prongs 444, the prongs slide along the surface of the upper margin during their inward movement. Since the prongs do not engage the upper during the translation of the wipers but only when they swing in an arc about the vertex 392, they, for all practicable purposes, move in a line that is substantially normal to the longitudinal center line of the last and thus drag the breast line portions of the upper and counter laterally of the center line of the last with substantially no toeward or heelward movement which provides for a desirably tight stretching of the upper about the last and a preclusion of the fading of the upper away from the wipers at the breast lines. This desired result is aided by the adhesive on the counter 554 being in a tacky condition so that the counter margin can slide along the insole and is also aided by the opening of the pincers 198 to release the forepart portions of the upper margin at about the time the pronged portions of the wipers engage the upper so that the portions of the upper margin moved inwardly by the wiper prongs 444 do not have to fight against the stretching forces on the upper applied by the pincers. The tight stretching of the upper about the last that had been provided by the pincers 198 is taken over and maintained by the engagement of the pronged wiper portions with the upper.

The forward movement of the piston rod 400 and the inward movement of the wipers 388 about the vertex 392 is terminated after the lug 432 of the coupling 402 engages the lug 430 on the stop 426. This engagement causes the stud 404 to move forwardly against the force of the spring 422 until the flange 420 of the bushing 418 strikes the rear wall 410 of the housing 414. Thus, a lost motion arrangement is provided between the engagement of the lugs 430, 432 and the stoppage of the piston rod 400 and the wipers 388 in response to the striking of the flange 420 against the housing wall 410. At any selected time during this lost motion operation, dependent on the positioning of the collar 438 on the stud 404, the collar 438 engages the valve spool 346 to shift the valve 434. By means of the circuitry described below, the shifting of the valve 434 effects the actuation of the motor 480 to present the low portion 490 of the cam 486 between the rollers 462, 478 and thus enable the springs 492 to raise the hold-down foot 470 so that the motor 20 applies upward pressure by the shoe assembly directly against the wiper bottoms. The shifting of the valve 434 also enables pressurized air under higher pressure than had heretofore entered the motor 20 to now enter the motor 20 to cause the shoe assembly to be forced against the wiper bottoms under relatively high bedding pressure. The precise time that the valve 434 is shifted during the inward movement of the wipers to effect the concurrent raising of the hold-down and the application of the heavier bedding pressure is largely dependent on the type of shoe being operated on and the particular lasting technique employed. At the conclusion of the wiper movement the parts are in the position shown in FIGS. 51 and 51A.

Figure 44:
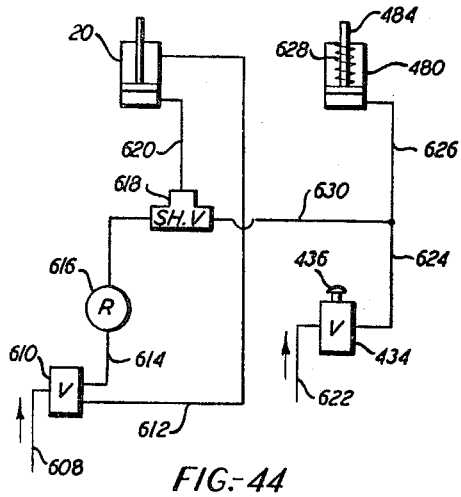
FIG. 44 is a schematic representation of that portion of the machine control circuit that operates to raise the hold-down foot and apply bedding pressure to the wiper bottoms toward the end of the inward swinging movement of the wipers.

The circuitry shown in FIG. 44 effects the raising of the hold-down foot 470 and the application of bedding pressure by the motor 20 in response to the shifting of the valve 434. In the idle condition of the machine, the motor 20 is maintained in its lower position by pressurized air entering it from a line 608 emanating from the source through a valve 610, and a line 612. The motor 20 had been caused to apply an upward force to the shoe assembly to thereby force the shoe assembly against the hold-down foot 470 under relatively low pressure by the shifting of the valve 610. This shifting of the valve 610 had enabled the air in the line 612 to be vented to atmosphere through this valve and had caused air to pass from the valve 610 through a line 614 incorporating a low pressure regulator 616, a shuttle valve 618 and a line 620 to the motor 20. The shuttle valve 618 is a standard commercial item that has two entrance ports and one exit port and is so constructed that when air at different pressures is entering the two entrance ports the higher pressure air will pass through the shuttle valve and out the exit port and the lower pressure air will be blocked at the valve. The shifting of the valve 434 causes air to pass from the source through a line 622, the valve 434 and lines 624 and 626 to the motor 480 to actuate this motor to move its piston rod 484 forwardly against the force of its return spring 628. The shifting of the valve 434 also causes the pressurized air under full line pressure to pass from the line 624 through a line 630, the shuttle valve 618 and the line 620 to the motor 20.

After the wipers have concluded their wiping stroke, they remain in position above the insole with the motor 20 providing bedding pressure on the now wiped upper and counter margins for a predetermined time interval that is sufficient to enable the counter to cool sufficiently to revert to its rigid condition and to enable the adhesive on the counter to cool sufficiently to effect a permanent bond between the upper margin and the insole 560 and between the upper 546 and the liner 548. At the end of this predetermined time interval the motor 540 is actuated to retract the piston rod 542 and allow the spring 508 to return the plate 506 and the pedal 498 to the FIG. 39 position. This enables the valves 512, 514 and 534 to revert to their original positions so that the machine parts are returned by the machine control system to their idle positions.

Figure 45:
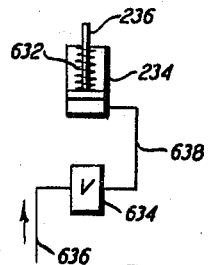
FIG. 45 is a schematic representation of that portion of the machine control circuit that operates the shoe assembly ejecting mechanism.

As indicated in FIG. 45, the return spring 632 of the motor 234 normally maintains the piston rod 236 in the FIG. 7 position. After the hold-down 468 and wipers 388 have been moved away from over the shoe assembly, and the pad 348 has disengaged the shoe assembly a valve 634 is momentarily shifted to enable a pulse of pressurized air to pass from the source through a line 636, the valve 634 and a line 638 to the motor 234 to momentarily raise the piston rod 236, the coil 240 and the cap 244 to cause the cap to engage the last 558 and thereby eject the shoe assembly from the last pin 224. Due to the inclination from the vertical of the orifice 246 the shoe assembly is ejected laterally of the longitudinal center line of the machine into a suitable receptacle (not shown).

Referring to FIG. 46, pressurized air normally flows to the motors 60 from the source through a line 638, a manually actuable valve 640 and line 642 and 644 to cause the motors to force the brake pad 50 against the ring 36 and thus lock in position the post 28 and the shoe assembly supporting members 250 and 170 carried by the post. In lasting a shoe, as set forth in pending application Serial No. 266,150 filed March 15, 1963, now Patent No. 3,241,164, it is desirable that the heel be symmetrically disposed with respect to the center line of the wipers 388 and the clamping pad 348. Due to the curvature of the last, this line of symmetry does not coincide with the center line of the last. Therefore, after the shoe assembly is placed on the plate 250 and last pin 224 with its toe portion resting on the toe rest roller 170, the valve 640 is actuated to shut off the flow of pressurized air to the motors 60 and allow the springs 646 in the motors 60 to retract the piston rods 62 and thereby release the brake pad 50 from the ring 36 and thus enable the operator to swing the post 28 and the shoe supporting parts carried thereby until the heel of the particular shoe to be lasted is symmetrically disposed with respect to the wipers. The operator then releases the valve 640 so that the post 28 is again locked in position by the brake pad 50.

To summarize the machine operation, the shoe assembly is placed bottom up on the last supporting plate 250 and last pin 224 with its toe portion resting on the toe rest roller 170 and the forepart portions of the upper inserted between the jaws of the pincers 198. The pincers 198 are then closed to grip the forepart portions of the upper and are then moved forwardly to horizontally stretch the upper about the heel of the last. The hold-down 468 is now moved forwardly from its out-of-the-way position to its working position above the shoe assembly bottom after which the shoe assembly together with the last pin 224, last supporting plate 250, toe rest 170 and pincers 198 are raised in unison until the insole 560 bears against the hold-down foot 470. After this, the main slide plate 260 is moved forwardly together with the clamping pad 348 and wipers 388 until the pad bight 350 engages the heel end extremity of the shoe assembly. In response to this engagement, the main slide plate is locked in position. After this the pincers 198 are raised to stretch the upper tightly on the last while the shoe assembly is clamped between the plate 250 and the hold-down foot 470. Now the clamping pad 348 is inflated with pressurized fluid and is brought to bear against the heel of the last. This is followed by a forward translation of the wipers 388, to cause the portion of the wipers at and adjacent their vertex 392 to cross over the heel end of the shoe assembly to wipe the upper and counter margins thereat down against the insole and then an inward swinging of the wipers about the vertex to wipe the remainder of the heel portions of the upper and counter margins against the insole with the wiper prongs 444 dragging the upper margins inwardly toward the center line of the last. The pincers 198 are opened to release the forepart portions of the upper concomitantly with the inward swinging movement of the wipers. At or near the end of the inward swinging movement of the wipers the hold-down foot 470 is raised to cause the insole 560 to bear directly against the wiper bottoms and, at the same time, the upwardly directed force of the shoe assembly is increased to provide bedding pressure between the insole and the wiper bottoms. After the application of the bedding pressure has been applied for a predetermined time, the machine parts are returned to their original position. After the hold-down 468, wipers 388 and clamping pad 348 have moved away from the shoe assembly, the cap 244 is caused to momentarily rise out of the last pin 224 and eject the shoe assembly from the last pin.

It should be understood that the present disclosure is for the purpose of illustration only and that this invention includes all modifications and equivalents that fall within the scope of the appended claims.

Terms in the claims indicating positions and paths of movements such as "below," "above" and "upward" have been employed primarily to define the relative positions and paths of movements of the parts and should be construed accordingly. Organizations which have equivalent relative positions and functional relationships between the parts to those defined in the claims are considered to fall within the scope of the claims regardless of whether the parts literally have the defined positions and paths of movement.

Terms in the claims indicating relative movement of one part with respect to another part have been employed to define this relative movement regardless of which of the two parts literally moves and should be construed accordingly so that organizations which have a movement of either of the defined parts with respect to the other defined part for performing the same result are considered to fall within the scope of the claims.

While the illustrative embodiment of the invention is a machine for stretching the heel portion of an upper on a last and wiping the heel portion of the upper margin against an insole, certain facets of the invention have wider utility and therefore have not been limited in the claims to utility in such a machine.

We claim:

1. A lasting machine, for wiping a selected portion of a shoe upper against a corresponding portion of a shoe insole, comprising: a post mounted for swinging movement about its longitudinal axis; shoe assembly supporting means for supporting a shoe assembly that includes a last having said shoe upper mounted thereon and said shoe insole located on its bottom with the margin of said upper portion extending away from said insole portion; means connecting the supporting means to the post to partake of said swinging movement of the post; wiping means; means for imparting relative movement of the wiping means with respect to the supporting means to cause the wiping means to engage said margin and wipe it against said insole portion; brake means normally operative to lock the post and the supporting means against said swinging movement; and means for releasing said brake means to enable the post and the supporting means to be swung to a selected position about said axis.

2. A lasting machine, for wiping a selected portion of a shoe upper against a corresponding portion of a shoe insole, comprising: a post mounted for vertical movement and for swinging movement about its vertical axis; shoe assembly supporting means for supporting bottom-up a shoe assembly that includes a last having said shoe upper mounted thereon and said shoe insole located on its bottom with the margin of said upper portion extending away from said insole portion; means connecting the supporting means to the post to partake of said vertical and swinging movements of the post; a hold-down located above the supporting means; wiping means mounted above the supporting means and outwardly of the hold-down for horizontal movement towards the shoe assembly; means for imparting a vertical thrust to the post to cause the insole to bear against the hold-down with the insole located slightly below the bottom of the wiping means; means for imparting horizontal movement to the wiping means to enable the wiping means to engage said margin and wipe it down against said insole portion; brake means normally operative to lock the post and the supporting means against said swinging movement while permitting vertical movement thereof; and means for releasing said brake means to enable the post and the supporting means to be swung to a selected position about said axis.

3. A lasting machine, for wiping a selected portion of a shoe upper against a corresponding portion of a shoe insole, comprising: a vertically extending post mounted for swinging movement about its vertical axis; shoe assembly supported means for supporting a shoe assembly that includes a last having said upper mounted thereon and said insole located on its bottom with the margin of said upper extending away from said insole portion; means connecting the supporting means to the post to partake of said swinging movement of the post; wiping means mounted above the supporting means for horizontal movement toward the shoe assembly; means for imparting horizontal movement to the wiping means to enable the wiping means to engage said margin and wipe it down against said insole portion; a first brake member connected to the post for swinging movement therewith about said axis; a second brake member positioned outwardly of the first brake member; locking means normally operative to force the second brake member against the first brake member and thereby lock the post and the supporting means against said swinging movement; and means for releasing said locking means to enable the post and the supporting means to be swung to a selected position about said axis.

4. A lasting machine, for wiping a selected portion of a shoe upper against a corresponding portion of a shoe insole, comprising: a post mounted for vertical movement and for swinging movement about its vertical axis; shoe assembly supporting means for supporting bottom- up a shoe assembly that includes a last having said shoe upper mounted thereon and said shoe insole located on its bottom with the margin of said upper portion extending away from said insole portion; means connecting the supporting means to the post to partake of said vertical and swinging movements of the post; a hold-down located above the supporting means; wiping means mounted above the supporting means and outwardly of the hold-down for horizontal movement toward the shoe assembly; means for imparting a vertical thrust to the post to cause the insole to bear against the hold-down with the insole located slightly below the bottom of the wiping means; means for imparting horizontal movement to the wiping means to enable the wiping means to engage said margin and wipe it down against said insole portion; a first brake member connected to the post for swinging movement therewith about said axis; means mounting said first brake member to constrain it against vertical movement while permitting vertical movement of the post; a second brake member positioned outwardly of the first brake member; locking means normally operative to force the second brake member against the first brake member and thereby lock the post and the supporting means against said swinging movement while permitting said vertical movement of the post; and means for releasing said locking means to enable the post and the supporting means to be swung to a selected position about said axis.

5. Braking mechanism comprising: a post mounted for movement along its longitudinal axis and for swinging movement about its longitudinal axis; means for imparting a thrust to the post along said axis; a first brake member connected to the post for swinging movement therewith; means so mounting said first brake member as to constrain it against movement along said axis while permitting movement of the post along said axis; a second brake member positioned outwardly of the first brake member; locking means normally operative to force the second brake member against the first brake member and thereby lock the post against said swinging movement while permitting the movement of the post along said axis; and means for releasing said locking means to enable the post to be swung to a selected position about said axis.

6. Braking mechanism comprising: a housing; a post mounted in the housing for swinging movement about its longitudinal axis and for movement along said axis; a ring extending about the post; means mounting the ring in the housing for swinging movement with the post about said axis but constraining it against movement along said axis; a plate mounted in the housing outwardly of the ring and for radial movement with respect to the ring; drive means normally operative to force the plate radially inwardly against the ring to thereby lock the post against said swinging movement while permitting the movement of the post along said axis; and means for releasing said drive means to enable the post to be swung to a selected position about said axis.

7. The mechanism as defined in claim 6 wherein said drive means comprises: a cam positioned radially outwardly of the plate and mounted for radial movement with respect to the post; a motor mounted on the housing; and linkage interposed between the motor and the cam operative in response to actuation of the motor to force the cam radially inwardly.

8. The mechanism as defined in claim 6 further comprising: a motor mounted in the housing; a drive rod extending from the motor to the post; and a connection between the rod and the post that permits the post to swing about its axis with respect to the rod and yet causes the post to move along its axis in response to movement of the rod.

9. A shoe upper stretching and heel seat lasting machine, for wiping the heel portion of a shoe upper against a shoe insole, comprising: wiping means mounted for movement in a wiping stroke from a retracted to an advanced position; a shoe assembly support, for supporting bottom-up a shoe assembly that includes a last having the shoe upper mounted thereon and the shoe insole located on its bottom with the heel of the assembly facing the wiping means, positioned forwardly of the wiping means; a toe rest located forwardly of the support for supporting the vamp of the shoe assembly; gripping means positioned to grip the margin of the upper in locations that are forward of said heel portion; means for moving the gripping means forwardly of the support and of the toe rest to stretch the upper about the heel of the last; means for thereafter raising the gripping means upwardly of the support and the toe rest to stretch the upper tightly on the last; and means for thereafter moving the wiping means through its wiping stroke to wipe the heel portion of the margin of the upper against the insole.

10. A shoe upper stretching and heel seat lasting machine, for wiping the heel portion of a shoe upper against a shoe insole, comprising: wiping means mounted for movement in a wiping stroke from a retracted to an advanced position; a shoe assembly support, for supporting bottom-up a shoe assembly that includes a last having the shoe upper mounted thereon and the shoe insole located on its bottom with the heel of the assembly facing the wiping means, positioned forwardly of the wiping means; a toe rest located forwardly of the support for supporting the vamp of the shoe assembly; gripping means positioned to grip the margin of the upper in locations that are forward of said heel portion; means for moving the gripping means forwardly of the support and of the toe rest to stretch the upper about the heel of the last; means for thereafter rigidly clamping the shoe assembly against movement; means for thereafter raising the gripping means upwardly of the support and the toe rest to stretch the upper tightly on the last; and means for thereafter moving the wiping means through its wiping stroke to wipe the heel portion of the margin of the upper against the insole.

11. A shoe upper stretching and heel seat lasting machine, for wiping the heel portion of a shoe upper against a shoe insole, comprising: wiping means mounted for movement in a wiping stroke from a retracted to an advanced position; a hold-down located forwardly of the wiping means; a shoe assembly support, for supporting bottom-up a shoe assembly that includes a last having the shoe upper mounted thereon and the shoe insole located on its bottom with the heel of the assembly facing the wiping means, positioned below the hold-down and forwardly of the wiping means; a toe rest located forwardly of the support for supporting the vamp of the shoe assembly; gripping means positioned to grip the margin of the upper in locations that are forward of said heel portion; means for moving the gripping means forwardly of the support and of the toe rest to stretch the upper about the heel of the last; means for thereafter raising the support together with the gripping means and toe rest to clamp the shoe assembly between the support and the hold-down; means for thereafter raising the gripping means upwardly of the support and the toe rest to stretch the upper tightly on the last; and means for thereafter moving the wiping means through its wiping stroke to wipe the heel portion of the margin of the upper against the insole.

12. A shoe upper tensioning mechanism, for stretching an upper on a last preparatory to wiping the margin of the heel of the upper against an insole located on the last bottom, comprising: a support for supporting bottom-up the last having the upper mounted thereon and the insole on its bottom; a framework located forwardly of the support; a toe rest so mounted in the framework that it is horizontally immovable; a carriage mounted in the framework for horizontal movement; a bar so mounted in the carriage as to partake of its horizontal movement and to be vertically movable therein; gripping means mounted on the bar for gripping the margin of the upper; first drive means interposed between the framework and the carriage to move the carriage and the gripping means forwardly; and second drive means interposed between the carriage and the bar to move the gripping means upwardly.

13. The mechanism as defined in claim 12 further comprising: means for adjusting in unison the vertical position of the toe rest and the gripping means.

14. The mechanism as defined in claim 13 further comprising: means for adjusting the vertical position of the toe rest independently of the gripping means.

15. A shoe upper stretching and heel seat lasting machine, for wiping the heel portion of a shoe upper against a shoe insole, comprising: wiping means mounted for movement in a wiping stroke from a retracted to an advanced position; a hold-down located forwardly of the wiping means; a post, mounted for heightwise movement, located below the wiping means and hold-down; a platform mounted on the post; a support, mounted on and extending upwardly of the platform forwardly of the wiping means and below the hold-down, for supporting bottom-up a shoe assembly that includes a last having the shoe upper mounted thereon and the shoe insole located on its bottom with the heel of the assembly facing the wiping means; a base mounted for forward and rearward movement on the platform below the support; means for effecting said base movement to adjust the position of the base in the platform; a carriage mounted for forward or rearward movement on the base forwardly of the support; gripping means, mounted for heightwise movement in the carriage, for gripping the margin of the upper in locations that are forward of said heel portion; means for moving the carriage together with the gripping means forwardly to stretch the upper about the heel of the last; means for thereafter raising the post together with the support and gripping means to clamp the shoe assembly between the support and the hold-down; means for thereafter raising the gripping means upwardly of the carriage and the support to stretch the upper tightly on the last; and means for thereafter moving the wiping means through its wiping stroke to wipe the heel portion of the margin of the upper against the insole.

16. The machine as defined in claim 15 wherein the means for effecting the base movement comprises: a reversible motor mounted on the platform rearwardly of the support; and connecting means between the motor and the base operative to move the base in alternate directions in response to movement of the motor alternate directions.

17. The machine as defined in claim 15 further comprising: a toe rest mounted on the carriage, for supporting the vamp of the shoe assembly, that is immovable in a forward and rearward direction.

18. The machine as defined in claim 17 further comprising: means for adjusting in unison the heightwise position of the gripping means and the toe rest.

19. The machine as defined in claim 18 further comprising: means for adjusting the heightwise position of the toe rest independently of the gripping means.

20. A shoe upper tensioning mechanism comprising: a framework; a carriage movably mounted in the framework for forward and rearward movement; gripping means mounted in the carriage for heightwise movement; a toe rest mounted in the framework for heightwise movement; adjusting means connected to the gripping means and the toe rest for adjusting their heightwise position in unison; first drive means connected to the carriage for moving the carriage and the gripping means forwardly in the framework; second drive means connected to the gripping means for moving the gripping means upwardly of the carriage; and connections between the gripping means and the toe rest so constructed and arranged as to preclude movement of the toe rest during the operation of the first and second drive means.

21. A shoe upper tensioning mechanism comprising: a framework; a carriage movably mounted in the framework for forward and rearward movement; a column mounted in the carriage for heightwise movement; a bar mounted in the column for heightwise movement; gripping means connected to the bar; a pillar mounted in the framework for heightwise movement; a toe rest connected to the pillar; connections between the column and pillar so constructed and arranged as to enable the column and the pillar to be moved heightwise in unison and as to enable the pillar to remain stationary when the carriage together with the column are moved forwardly and rearwardly in the framework; adjusting means connected to the column and pillar for adjusting their heightwise position in the unison; first drive means connected to the carriage for moving the carriage and the gripping means forwardly in the framework; and second drive means connected to bar for moving the bar and the gripping means upwardly of the column.

22. A shoe upper tensioning mechanism comprising: a framework; a carriage movably mounted in the framework for forward and rearward movement; a column mounted in the carriage for heightwise movement; a bar mounted in the column for heightwise movement; gripping means connected to the bar; a pillar mounted in the framework for heightwise movement and located rearwardly of the column; a toe rest connected to the pillar; a prong extending forwardly from the column and slidably through the pillar whereby the column and pillar are enabled to be moved heightwise in unison and the pillar is enabled to remain stationary when the carriage together with the column are moved forwardly and rearwardly in the framework; adjusting means connected to the column for adjusting the heightwise position of the column and pillar in unison; a first drive means interposed between the framework and carriage for moving the carriage and the gripping means forwardly in the framework; and second drive means interposed between the column and the bar for moving the bar and gripping means upwardly of the column.

23. The shoe upper tensioning mechanism as defined in claim 22 wherein said adjusting means comprises: an extension on said column; a stud connected to the extension; a socket on the carriage; a threaded connection between the sprocket and the stud; and means for rotating the sprocket.

24. The shoe upper tensioning mechanism as defined in claim 23 wherein said second drive means comprises: a motor connected to the extension, said motor having a rod, that is movable in response to actuation of the motor, connected to the bar.

25. In a machine for working on shoe parts that are mounted on a last: a last support means that includes an upwardly extending last pin adapted to enter a hole in the last to support the last and the shoe parts bottom-up; a bore located in and extending longitudinally of the pin; a plunger slidably mounted in the bore that is normally positioned within the bore; and means for reciprocating the plunger to raise it above the pin and thus eject the last from the last support means and then to lower the plunger to its normal position.

26. The combination as defined in claim 25 wherein the portion of the bore that intersects the top of the pin is inclined from the longitudinal axis of the pin whereby the plunger ejects the last laterally of the last pin.

27. The combination as defined in claim 25 wherein the plunger reciprocating means comprises: a motor, connected to and depending from the pin, having a rod that is movable in response to actuation of the motor; and a connection between the rod and the plunger.

28. The combination as defined in claim 25 wherein the plunger reciprocating means comprises: a cylinder connected to and extending downwardly of the pin; a motor, secured to and depending from the cylinder, having a rod movably mounted in the cylinder that is movable in response to actuation of the motor; and a connection between the rod and the plunger.

29. The combination as defined in claim 28 wherein the portion of the bore that intersects the top of the pin is inclined from the longitudinal axis of the pin and the connection between the rod and the plunger comprises a flexible coil.

30. A last support comprising: a hollow column; a sleeve threaded interiorly of the column; last supporting means mounted on the sleeve; and a connection between the last supporting means and the column so constructed and arranged as to preclude rotation of the sleeve about its axis when the sleeve is moved with respect to the column.

31. A last support as defined in claim 30 wherein said last supporting means comprises: a last pin holder supported on the sleeve; a last pin anchored in the last pin holder and extending upwardly thereof; a last supporting plate; means mounting the last supporting plate on the last pin holder with the pin extending through the plate to permit shifting of the plate relative to the holder and the pin transversely of the axis of the pin; and a hole in the last supporting plate, that is oversize relative to the last pin, through which the last pin projects.

32. A last support comprising: a hollow column; a hollow sleeve threaded interiorly of the column; a tube supported on the sleeve and extending interiorly of the sleeve; a connection between the tube and the column so constructed and arranged as to preclude rotation of the tube about its axis when the sleeve is moved with respect to the column; a last pin anchored in the tube and extending upwardly thereof; a last supporting plate so mounted on the tube that the pin extends through the plate and the plate is shiftable on the tube transversely of the axis of the pin; and a hole in the last supporting plate, that is oversize relative to the last pin, through which the last pin projects.

33. The last support as defined in claim 32 further comprising: a bore extending longitudinally of the pin; a plunger slidably mounted in the bore that is normally positioned within the bore; a cylinder connected to and extending downwardly of the pin; a motor, secured to and depending from the cylinder, having a rod movably mounted in the cylinder that is movable in response to actuation of the motor; and a connection between the rod and the plunger.

34. A lasting machine, for wiping a selected portion of the margin of a shoe upper against a corresponding portion of a shoe insole, comprising: a support for supporting bottom-up a shoe assembly that includes a last having the upper mounted thereon and the insole located on its bottom; a frame; a plate mounted in the frame for movement toward and away from the shoe assembly; means for initially maintaining a plate in a rearward position that is relatively remote from the shoe assembly; wiping means connected to the plate for movement in unison therewith and mounted to move relative to the plate in a wiping stroke from a retracted position to an advanced position; means for initially maintaining the wiping means in its retracted position; a clamp mounted on the plate below the wiping means; drive means operative to move the plate forwardly from its remote position to cause the clamp to bear against the shoe assembly with the wiping means moving forwardly in unison with the plate; means responsive to engagement of the clamp with the shoe assembly to lock the plate against movement; and means for thereafter causing the wiping means to move through a wiping stroke to wipe said margin against said insole.

35. A lasting machine, for wiping the margin of the heel portion of a shoe upper against the heel portion of a shoe insole, comprising: a support for supporting bottom-up a shoe assembly that includes a last having the upper mounted thereon and the insole located on its bottom; a frame; a plate mounted in the frame for movement toward and away from the heel of the shoe assembly; means for initially maintaining the plate in a rearward position that is relatively remote from the shoe assembly; wiping means connected to the plate for movement in unison therewith and mounted to move relative to the plate in a wiping stroke from a retracted position to an advanced position; a clamp, mounted on the plate below the wiping means, having a bight and a pair of legs diverging forwardly from the bight on opposite sides of the bight; means for initially maintaining the clamp legs in a relatively open position; drive means operative to move the plate forwardly from its remote position to cause the bight of the clamp to bear against the heel end of the shoe assembly with the wiping means moving forwardly in unison with the plate; means responsive to engagement of the bight of the clamp with the shoe assembly to lock the plate against movement; means for thereafter moving the clamp legs inwardly to cause them to bear against the shoe assembly; and means for thereafter causing the wiping means to move through a wiping stroke to wipe said margin against said insole.

36. A lasting machine, for wiping the margin of the heel portion of a shoe upper against the heel portion of a shoe insole, comprising: a support for supporting bottom-up a shoe assembly that includes a last having the upper mounted thereon and the insole located on its bottom; a frame; a plate mounted in the frame for movement toward and away from the heel of the shoe assembly; means for initially maintaining the plate in a rearward position that is relatively remote from the shoe assembly; wiping means connected to the plate for movement in unison therewith and mounted to move relative to the plate in a wiping stroke from a retracted position to an advanced position; a clamp, located below the wiping means, having a bight and a pair of legs diverging forwardly from the bight on opposite sides of the bight; a beam movably mounted on the plate for forward and rearward movement with respect to the plate; a pair of levers pivotally connected to the beam for swinging movement about axes transverse to the plane of movement of the beam, said levers having legs extending forwardly and divergently from said axes exteriorly of said clamp legs; joining means connecting each lever leg to its associated clamp leg and the beam to the clamp bight; spring means for yieldably urging the beam forwardly and thereby yieldably urging the lever legs apart about said axes; first drive means, connected to said levers, adapted to swing the levers inwardly about said axes; second drive means operative to move the plate forwardly from its remote position to cause the bight of the clamp to bear against the heel end of the shoe assembly with the wiping means moving forwardly in unison with the plate and to cause the beam to move rearwardly with respect to the plate against the force of the spring means; means operative in response to rearward movement of the beam to lock the plate against movement; means for thereafter actuating the first drive means to swing the levers inwardly about said axes and thereby move the clamp legs inwardly to cause them to bear against the shoe assembly; and means for thereafter causing the wiping means to move through a wiping stroke to wipe said margin against said insole.

37. A lasting machine, for wiping the margin of the heel portion of a shoe upper against the heel portion of a shoe insole, comprising: a support for supporting bottom-up a shoe assembly that includes a last having the upper mounted thereon and the insole located on its bottom; a frame; a plate mounted in the frame for movement toward and away from the heel of the shoe assembly; first motor means connected to the plate for effecting its movement; means for initially causing said first motor means to maintain the plate in a rearward position that is relatively remote from the shoe assembly; a brake, mounted in the frame, that is cooperative with said plate and is movable to and from a locking position wherein it locks the plate against movement in any position of the plate in the frame; second motor means connected to the brake for effecting its movement; means for initially causing said second motor means to maintain the brake out of said locking position; wiping means connected to the plate for movement in unison therewith and mounted to move relative to the plate in a wiping stroke from a retracted position to an advanced position; a clamp, located below the wiping means, having a bight and a pair of legs diverging forwardly from the bight on opposite sides of the bight; a beam movably mounted on the plate for forward and rearward movement with respect to the plate; a pair of levers pivotally connected to the beam for swinging movement about axes transverse to the plane of movement of the beam, said levers having legs extending forwardly and divergently from said axes exteriorly of said clamp legs; joining means connecting each lever leg to its associated clamp leg and the beam to the clamp bight; spring means for yieldably urging the beam forwardly and thereby urging the lever legs apart about said axes; third motor means connected to said levers and operative when actuated to swing the lever legs inwardly about said axis; means to initially maintain said third motor means in unactuated condition; a control member for said second motor means and an actuating member for said control member, one of said members being mounted on the plate and the other of said members being mounted for movement in unison with the beam, said members being so constructed and arranged as to be normally out of cooperative relationship and to be brought into cooperative relationship when the beam is moved rearwardly against the force of the spring means; means for actuating the first motor means to move the plate forwardly from its remote position to cause the bight of the clamp to bear against the heel end of the shoe assembly with the wiping means moving forwardly in unison with the plate and to cause the beam to move rearwardly with respect to the plate against the force of the spring means thereby bringing said members into cooperative relationship to actuate the control member; means responsive to actuation of the control member to cause said second motor means to move the brake into locking position and thereby lock the plate against movement; means for thereafter actuating the third motor means to swing the lever legs inwardly about said axes and thereby move the clamp legs inwardly to cause them to bear against the shoe assembly; and means for hereafter causing the wiping means to move through a wiping stroke to wipe said margin against said insole.

38. A clamping mechanism comprising: a support for supporting a shoe assembly that includes a last having an upper mounted thereon; a frame; a plate mounted in the frame for movement toward and away from the shoe assembly; means for initially maintaining the plate in a rearward position that is relatively remote from the shoe assembly; a clamp mounted on the plate; drive means operative to move the plate forwardly from its remote position to cause the clamp to bear against the shoe assembly; and means responsive to engagement of the clamp with the shoe assembly to lock the plate against movement.

39. A mechanism, for clamping the heel of an upper against a last, comprising: a support for supporting a shoe assembly that includes the last having the upper mounted thereon; a frame; a plate mounted in the frame for movement toward and away from the heel of the shoe assembly; means for initially maintaining the plate in a rearward position that is relatively remote from the shoe assembly; a clamp, mounted on the plate, having a bight and a pair of legs diverging forwardly from the bight on opposite sides of the bight; means for initially maintaining the clamp legs in a relatively open position; drive means operative to move the plate forwardly from its remote position to cause the bight of the clamp to bear against the heel end of the shoe assembly; means responsive to engagement of the bight of the clamp with the shoe assembly to lock the plate against movement; and means for thereafter moving the clamp legs inwardly to cause them to bear against the shoe assembly.

40. A mechanism, for clamping the heel of an upper against a last, comprising: a support for supporting bottom-up a shoe assembly that includes the last having the upper mounted thereon; a frame; a plate mounted in the frame for movement toward and away from the heel of the shoe assembly; means for initially maintaining the plate in a rearward position that is relatively remote from the shoe assembly; a clamp having a bight and a pair of legs diverging forwardly from the bight on opposite sides of the bight; a beam movably mounted on the plate for forward and rearward movement with respect to the plate; a pair of levers pivotally connected to the beam for swinging movement about axes transverse to the plane of movement of the beam, said levers having legs extending forwardly and divergently from said axes exteriorly of said clamp legs; joining means connecting each lever leg to its associated clamp leg and the beam to the clamp bight; spring means for yieldably urging the beam forwardly and thereby yieldably urging the lever legs apart about said axes; first drive means, connected to said levers, adapted to swing the levers inwardly about said axes; second drive means operative to move the plate forwardly from its remote position to cause the bight of the clamp to bear against the heel end of the shoe assembly and to cause the beam to move rearwardly with respect to the plate against the force of the spring means; means operative in response to rearward movement of the beam to lock the plate against movement; and means for thereafter actuating the first drive means to swing the levers inwardly about said axes and thereby move the clamp legs inwardly to cause them to bear against the shoe assembly.

41. A mechanism, for clamping the heel of an upper against a last, comprising: a support for supporting bottom-up a shoe assembly that includes the last having the upper mounted thereon; a frame; a plate mounted in the frame for movement toward and away from the heel of the shoe assembly; first motor means connected to the plate for effecting its movement; means for initially causing said first motor means to maintain the plate in a rearward position that is relatively remote from the shoe assembly; a brake, mounted in the frame, that is cooperative with said plate and is movable to and from a locking position wherein it locks the plate against movement in any position of the plate in the frame; second motor means connected to the brake for effecting its movement; means for initially causing said second motor means to maintain the brake out of said locking position; a clamp having a bight and a pair of legs diverging forwardly from the bight on opposite sides of the bight; a beam movably mounted on the plate for forward and rearward movement with respect to the plate; a pair of levers pivotally connected to the beam for swinging movement about axes transverse to the plane of movement of the beam, said levers having legs extending forwardly and divergently from said axes exteriorly of said clamp legs; joining means connecting each lever leg to its associated clamp leg and the beam to the clamp bight; spring means for yieldably urging the beam forwardly and thereby urging the lever legs apart about said axes; third motor means connected to said levers and operative when actuated to swing the lever legs inwardly about said axes; means to initially maintain said third motor means in unactuated condition; a control member for said second motor means and an actuating member for said control member, one of said members being mounted for movement in unison with the beam, said members being so constructed and arranged as to be normally out of cooperative relationship and to be brought into cooperative relationship when the beam is moved rearwardly against the force of the spring means; means for actuating the first motor means to move the plate forwardly from its remote position to cause the bight of the clamp to bear against the heel end of the shoe assembly and to cause the beam to move rearwardly with respect to the plate against the force of the spring means thereby bringing said members into cooperative relationship to actuate the control member; means responsive to actuation of the control member to cause said second motor means to move the brake into locking position and thereby lock the plate against movement; and means for thereafter actuating the third motor means to swing the lever legs inwardly about said axes and thereby move the clamp legs inwardly to cause them to bear against the shoe assembly.

42. A lasting machine comprising: wiping means mounted for movement in a wiping stroke from a retracted to an advanced position; a support adjacent the wiping means for supporting bottom-up a last having a shoe upper and insole thereon; a hold-down foot located above the support with its bottom located slightly below the bottom of the wiping means; powered means operatively connected to the support to apply an upward force thereto with the insole bearing against the hold-down foot; a first motor having a rod that is driven forwardly upon operation of the first motor and which rod is operatively connected to the wiping means to move the wiping means through at least the latter part of its wiping stroke to wipe the margin of the upper down against the insole, a first lug rigidly mounted on the rod for movement with the rod; a second lug positioned in alignment with the first lug and mounted for forward movement from a first position to a second position; spring means for yieldably urging the second lug into said first position; a second motor operatively connected to the hold-down foot and operative upon actuation to raise the hold-down foot; a control member; means responsive to actuation of the control member for operating the second motor to raise the hold-down foot; and an actuating member for the control member mounted for movement with the second lug, said actuating member being so constructed and arranged as to be out of cooperative relationship with the control member when the second lug is in its first position and to be brought into cooperative relationship with the control member during the movement of the second lug from its first to its second position; whereby the operation of the first motor causes the wiping means to wipe the margin of the upper against the insole until the movement of the rod is terminated by the arrival of the second lug at the second position and the hold-down foot is caused to be raised during the travel of the second lug from the first to the second position to cause the powered means to press the wiped upper margin against the bottom of the wiping means.

43. The lasting machine as defined in claim 42 further comprising: means for adjusting the first and second positions of the second lug in unison toward and away from the first lug.

44. A lasting machine comprising: wiping means mounted for movement in a wiping stroke from a retracted to an advanced position; a support adjacent the wiping means for supporting bottom-up a last having a shoe upper and insole thereon; a hold-down foot located above the support with its bottom located slightly below the bottom of the wiping means; powered means operatively connected to the support; regulating means enabling the powered means to apply an upward force to the support under relatively light or relatively heavy pressure; means for initially actuating the regulating means to cause the powered means to apply the upward force to the support under the relatively light pressure with the insole bearing against the hold-down foot; a first motor having a rod that is driven forwardly upon operation of the first motor and which rod is operatively connected to the wiping means to move the wiping means through at least the latter part of its wiping stroke to wipe the margin of the upper down against the insole; a first lug mounted for movement with the rod; a second lug positioned in alignment with the first lug and mounted for forward movement from a first position to a second position; spring means for yieldably urging the lug into said first position; a second motor operatively connected to the hold-down foot and operative upon actuation to raise the hold-down foot; a control member; means responsive to actuation of the control member for concomitantly operating the second motor to raise the hold-down foot and to enable the regulating means to cause the powered means to apply an upward force to the support under the relatively heavy pressure; and an actuating member for the control member mounted for movement with the second lug, said actuating member being so constructed and arranged as to be out of cooperative relationship with the control member when the second lug is in its first position and to be brought into cooperative relationship with the control member during the movement of the second lug from its first to its second position; whereby the operation of the first motor causes the wiping means to wipe the margin of the upper against the insole until the movement of the rod is terminated by the arrival of the second lug at the second position and during the travel of the second lug from the first to the second position the hold-down foot is caused to be raised and the powered means is caused to apply the upward force to the support under the relatively heavy pressure so that the wiped upper margin is pressed against the bottom of the wiping means under the relatively heavy pressure.

45. The lasting machine as defined in claim 44 further comprising: means for adjusting the first and second positions of the second lug in unison toward and away from the first lug.

46. A lasting machine comprising: wiping means mounted for movement in a wiping stroke from a retracted to an advanced position; a support adjacent the wiping means for supporting bottom-up a last having a shoe upper and insole thereon; a hold-down foot located above the support with its bottom located slightly below the bottom of the wiping means; powered means operatively connected to the support to apply an upward force thereto with the insole bearing against the hold-down foot; a first motor having a rod that is driven forwardly upon operation of the first motor and which rod is operatively connected to the wiping means to move the wiping means through at least the latter part of its wiping stroke to wipe the margin of the upper down against the insole; a first lug rigidly mounted on the rod for movement therewith; a stud mounted for forward movement from a first position to a second position; a second lug mounted on the stud and positioned in alignment with the first lug; spring means for yieldably urging the stud into said first position; a second motor operatively connected to the hold-down foot and operative upon actuation to raise the hold-down foot; a control member located adjacent the stud; means responsive to actuation of the control member for operating the second motor to raise the hold-down foot; and an actuating member for the control member mounted on the stud, said actuating member being so constructed and arranged as to be out of cooperative relationship with the control member when the stud is in its first position and to be brought into cooperative relationship with the control member during the movement of the stud from its first to its second position; whereby the operation of the first motor causes the wiping means to wipe the margin of the upper against the insole until the movement of the rod is terminated by the arrival of the stud at the second position and the hold-down foot is caused to be raised during the travel of the stud from the first to the second position to cause the powered means to press the wiped upper margin against the bottom of the wiping means.

47. The lasting machine as defined in claim 46 further comprising: means for adjusting the position of the second lug on the stud toward and away from the first lug.

48. A lasting machine comprising: wiping means mounted for movement in a wiping stroke from a retracted to an advanced position; a support adjacent the wiping means for supporting bottom-up a last having a shoe upper and insole thereon; a hold-down foot located above the support with its bottom located slightly below the bottom of the wiping means; powered means operatively connected to the support; regulating means enabling the powered means to apply an upward force to the support under relatively light or relatively heavy pressure; means for initially actuating the regulating means to cause the powered means to apply the upward force to the support under the relatively light pressure with the insole bearing against the hold-down foot; a first motor having a rod that is driven forwardly upon operation of the first motor and which rod is operatively connected to the wiping means to move the wiping means through at least the latter part of its wiping stroke to wipe the margin of the upper down against the insole; a first lug mounted on the rod for movement therewith; a stud mounted for forward movement from a first to a second position; a second lug mounted on the stud and positioned in alignment with the first lug; spring means for yieldably urging the stud into said first position; a second motor operatively connected to the hold-down foot and operative upon actuation to raise the hold-down foot; a control member located adjacent the stud; means responsive to actuation of the control member for concomitantly operating the second motor to raise the hold-down foot and to enable the regulating means to cause the powered means to apply an upward force to the support under the relatively heavy pressure; and an actuating member for the control member mounted on the stud, said actuating member being so constructed and arranged as to be out of cooperative relationship with the control member when the stud is in its first position and to be brought into cooperative relationship with the control member during the movement of the stud from its first to its second position; whereby the operation of the first motor causes the wiping means to wipe the margin of the upper against the insole until the movement of the rod is terminated by the arrival of the stud at the second position and during the travel of the stud from the first position to the second position the hold-down foot is caused to be raised and the powered means is caused to apply upward force to the support under the relatively heavy pressure so that the wiped upper margin is pressed against the bottom of the wiping means under the relatively heavy pressure.

49. The lasting machine as defined in claim 48 further comprising: means for adjusting the position of the second lug on the stud toward and away from the first lug.

50. A mechanism for controlling the operation of an instrumentality comprising: a stud mounted for movement from a first position to a second position; spring means for yieldably urging the stud into said first position; a control member, adapted when actuated to effect the operation of the instrumentality, located adjacent the stud; and an actuating member for the control member mounted on the stud rearwardly of and in alignment with the control member, the distance between the actuating member and the control member being such that during the travel of the stud from said position to said second position the actuating member is caused to intersect and actuate the control member.

51. A mechanism for controlling the operation of an instrumentality comprising: a housing having a wall; an opening in the wall; a hollow bushing slidably mounted in the opening; a rib positioned rearwardly of said wall; an opening in the rib; a stud extending through and fixed in the bushing, said stud extending rearwardly of the bushing and slidably through the rib opening; a flange on the bushing between the housing wall and the rib having a larger diameter than the rear wall opening and the rib opening and a thickness that is less than the distance between the rear wall and the rib; spring means for yieldably urging the stud to a first position where the flange bears against the rib; a control member, adapted when actuated to effect the operation of the instrumentality, located adjacent the stud; and an actuating member for the control member mounted on the stud rearwardly of and in alignment with the control member, the distance between the actuating member and the control member being such that during the travel of the stud from said first position to a second position where the flange bears against the rear wall the actuating member is caused to intersect and actuate the control member.

52. The mechanism as defined in claim 51 having means for moving the stud from the first to the second position comprising: a first lug; means for imparting forward movement to the first lug; and a second lug on the stud located in alignment with and forwardly of the first lug.

53. The mechanism as defined in claim 52 further comprising: means for adjusting the position of the second lug toward and away from the first lug.

54. A mechanism for controlling the operation of an instrumentality comprising: a housing having a rear wall and a front wall; a cut-out in the housing between said walls, said cut-out having a top wall and a bottom wall; an opening in the rear wall; an opening in the front wall; a hollow bushing slidably and rotatably mounted in the rear wall opening; a rib positioned rearwardly of said rear wall; an opening in the rib; a stud extending through and fixed in said bushing, said stud extending rearwardly of the bushing and slidably and rotatably through the rib opening and also extending forwardly of the bushing across the cut-out and slidably and rotatably in the front wall opening; a screw thread on a portion of the stud that extends across the cut-out; a flange on the bushing between the rear wall and the rib having a larger diameter than the rear wall opening and the rib opening and a thickness that is less than the distance between the rear wall and the rib; spring means for yieldably urging the stud to a first position where the flange bears against the rib; a control member, adapted when actuated to effect the operation of the instrumentality, located adjacent the stud; a collar, adapted to actuate the control member, mounted on the stud rearwardly of and in alignment with the actuating member, the distance between the collar and the control member being such that during the travel of the stud from said first position to a second position where the flange bears against the rear wall the collar is caused to intersect and actuate the control member; a first lug; means for imparting forward movement to the first lug; and a second lug that is threaded onto said stud portion and bears against said top and bottom wall, said second lug being located in alignment with and forwardly of the first lug.

55. A mechanism, for holding in place a shoe assembly that includes a last having a shoe upper mounted thereon and a shoe insole located on its bottom while a selected portion of the margin of the upper is wiped against a corresponding portion of the insole, comprising: a support, mounted for heightwise movement, for supporting the shoe assembly bottom-up; a hold-down foot, positioned higher than the support, mounted for movement from a rearward out-of-the-way position to a forward working position above the support; means for initially maintaining the support in a lower position wherein the shoe assembly is placed on the support and the shoe upper is stretched about the last; means for initially maintaining the hold-down foot in its rearward position so that it will not interfere with the placement of the shoe assembly on the support or the stretching of the upper about the last; means for thereafter moving the hold-down foot from its rearward to its forward position with the hold-down foot spaced from the bottom of the show assembly in said forward position; and means for thereafter raising the support to clamp the shoe assembly between the support and the hold-down foot.

56. The mechanism as defined in claim 55 further comprising: wiping means mounted for movement in a wiping stroke from a retracted to an advanced position with the bottom of the wiping means located at a level that is slightly above the bottom of the hold-down foot; means for initially maintaining the wiping means in its retracted position; and means for moving the wiping means through its wiping stroke after the support has been raised to wipe said margin portion against said insole portion.

57. A lasting machine, for wiping a selected portion of the margin of a shoe upper against a corresponding portion of a shoe insole, comprising: a support, mounted for heightwise movement, for supporting bottom-up a shoe assembly that has the upper mounted thereon and the insole located on its bottom; means for initially maintaining the support in a lower position wherein the shoe assembly is placed on the support and the shoe upper is stretched about the last; a frame; wiping means mounted in the frame for movement in a wiping stroke from a retracted to an advanced position; means for initially maintaining the wiping means in its retracted position; a slide mounted in the frame above the wiping means for movement from a rearward out-of-the-way position to a forward working position; a hold-down mounted on the slide having a hold-down foot whose bottom is slightly below the bottom of the wiping means; means for initially maintaining the slide in its rearward position so that the hold-down will not interfere with the placement of the shoe assembly on the support or the stretching of the upper about the last; means for thereafter moving the slide from its rearward to its forward position to place the hold-down foot spacedly above the insole; means for thereafter raising the support to clamp the shoe assembly between the support and the hold-down foot; and means for thereafter moving the wiping means through its wiping stroke to wipe said margin portion against said insole portion.

58. A method of heel seat lasting by wiping the margin of the heel portion of a shoe upper, that extends from the vicinity of its breastlines rearwardly to its heel end, against the corresponding portion of a shoe insole comprising: providing a last having the upper mounted thereon and the insole located on its bottom; gripping the upper margin on each side of the last forwardly of said heel portion; applying a pulling force to the gripped margin portions to stretch the upper tightly about the heel of the last with the margin of said heel portion of the upper extending away from the insole; moving wiping means inwardly of the last, against the margin of said heel portion of the upper and across the insole to wipe the margin of said heel portion of the upper against the insole with the wiping means in the vicinity of the breastlines of the upper having components of movement that are at right angles to the longitudinal center line of the last; and releasing the gripped margin portions concomitantly with the application of the wiping means to the vicinity of the breast line portions of the upper margin.

59. The method as defined in claim 58 further comprising: clamping said heel portion of the upper against the corresponding side portion of the last prior to moving the wiping means against said heel portion of the upper margin.

60. The method as defined in claim 58 wherein the wiping means includes a pair of spaced segments that each have at least one prong depending from an otherwise smooth undersurface and wherein each of said wiper segments is applied to the vicinity of a breast line portion of the upper margin to cause the prongs to drag the upper margins in the vicinity of the breastlines inwardly during the inward movement of the wiping means.

61. The method as defined in claim 60 further comprising: clamping said heel portion of the upper against the corresponding side portion of the last prior to moving the wiping means against said heel portion of the upper margin.

62. A method of heel seat lasting by wiping the margin of the heel portion of a show upper, that extends from the vicinity of the breastline rearwardly to its heel end, against the corresponding portion of a shoe insole comprising: supporting bottom-up a last having the upper mounted thereon and the insole located on its bottom; providing a pair of wipers that have side surfaces diverging forwardly from a bight, that are mounted for inward and outward swinging movement about a vertex that is proximate to the bight, and that each have at least one prong depending from an otherwise smooth undersurface in a region relatively remote from and forwardly of the vertex; supporting the wipers adjacent the heel of the last so that said side surfaces are exterior of said heel position of the upper and last; gripping the upper margin on each side of the last forwardly of said heel portion; applying a pulling force to the gripped margin portions to stretch the upper tightly about the heel of the last with the margin of said heel portion of the upper extending upwardly of the insole; imparting forward movement and inward swinging movement about the vertex to the wipers so that the bight of the wipers and the wiper side surfaces cross the last to wipe said heel portion of the upper against the insole and to cause the prongs to drag the upper margins in the vicinity of the breastlines inwardly during these movements and stretch the upper tightly about the last; and releasing the gripped margin portions concomitantly with the application of said pronged regions of the wipers to the vicinity of the breastline portions of the upper margin.

63. The method as defined in claim 62 further comprising: clamping said heel portion of the upper against the corresponding side portion of the last prior to imparting said wiper movements.

64. A method of heel seat lasting by wiping the margin of the heel portion of a shoe upper, that extends from the vicinity of its breastlines rearwardly to its heel end, against the corresponding portion of a shoe insole comprising: supporting bottom-up a last having the upper mounted thereon and the insole located on its bottom; providing a pair of wipers that have side surfaces diverging forwardly from a bight, that are mounted for inward and outward swinging movement about a vertex that is proximate to the bight, and that each have at least one prong depending from an otherwise smooth undersurface in a region relatively remote from and forwardly of the vertex; supporting the wipers adjacent the heel of the last so that said side surfaces are exterior of said heel portion of the upper and last; gripping the upper margin on each side of the last forwardly of said heel portion; applying a pulling force to the gripped margin portions to stretch the upper tightly about the heel of the last with the margin of said heel portion of the upper extending upwardly of the insole; imparting forward translation to the wipers so that the bight of the wipers crosses the last to wipe the upper margin at said heel end upon the insole with the prongs remaining exteriorly of the last; swinging the wiper side surfaces inwardly about the vertex to cause the remainder of the wiper side surfaces to cross the last and wipe the remainder of said heel portion of the upper margin against the insole and to cause the prongs to drag the upper margins in the vicinity of the breast lines inwardly during this movement and stretch the upper lightly about the last; and releasing the gripped margin portions concomitantly with the inward swinging of the wiper side surfaces.

65. The method as defined in claim 64 further comprising: clamping said heel portion of the upper against the corresponding side portion of the last prior to imparting the forward translation to the wipers.

66. A heel seat lasting machine for wiping the margin of the heel portion of a shoe upper, that extends from the vicinity of its breastlines rearwardly to its heel end, against the corresponding portion of a shoe insole comprising: a support for supporting a last having the upper mounted thereon and the insole located on its bottom; wiping means supported adjacent said heel portion of the upper; gripping means located forwardly of the wiping means and above the support on each side of the support; means for actuating the gripping means to grip the upper margin on each side of the last forwardly of said heel portion and exert a pulling force on the upper to stretch the upper tightly about the heel of the last with the margin of said heel portion of the upper extending away from the insole; means for causing the wiping means to move inwardly of the last, against the margin of said heel portion of the upper and across the insole to wipe the margin of said heel portion of the upper against the insole with the wiping means in the vicinity of the breastlines of the upper having components of movement that are at right angles to the longitudinal center line of the last; and means for causing the gripping means to release the gripped margin portions concomitantly with the application of the wiping means to the vicinity of the breast line portions of the upper margin.

67. The machine as defined in claim 66 further comprising: heel clamping means located below the wiping means; and means for forcing the clamping means against said heel portion of the upper to force it against the corresponding side portion of the last prior to operating the means for moving the wiping means.

68. The machine as defined in claim 66 wherein said wiping means comprises: a pair of spaced segments that each have at least one prong depending from an otherwise smooth undersurface; and wherein the means for causing said movement of the wiping means causes each of said wiper segments to be applied to the vicinity of a breastline portion of the upper margin to cause the prongs to drag the upper margin in the vicinity of the breastlines inwardly during the inward movement of the wiping means.

69. The machine as defined in claim 68 further comprising: heel clamping means located below the wiping means; and means for forcing the clamping means against said heel portion of the upper to force it against the corresponding side portion of the last prior to operating the means for moving the wiping means.

70. A heel seat lasting machine for wiping the margin of the heel portion of a shoe upper, that extends from the vicinity of its breastlines rearwardly to its heel end, against the corresponding portion of a shoe insole comprising: a support for supporting bottom-up a last having the upper mounted thereon and the insole located on its bottom; a pair of wipers having side surfaces that diverge forwardly from a bight; means constructing the wipers to enable the side surfaces to swing inwardly and outwardly about a vertex that is proximate to the bight; at least one prong in each wiper depending from an otherwise smooth under-surface in a region relatively remote from and forwardly of the vertex; means supporting the wipers adjacent the heel of the last so that said side surfaces are exterior of said heel portion of the upper and last; gripping means located forwardly of the wiping means and above the support on each side of the support; means for actuating the gripping means to grip the upper margin on each side of the last forwardly of said heel portion and exert a pulling stress on the upper to stretch the upper tightly about the heel of the last with the margin of said heel portion of the upper extending upwardly of the insole; means for imparting forward and inward swinging movement to the wipers to cause the bight of the wipers and the wiper side surfaces to cross the last to wipe said heel portion of the margin against the insole and to cause the prongs to drag the upper margin in the vicinity of the breastlines inwardly during these movements and stretch the upper tightly about the last; and means for causing the gripping means to release the gripped margin portions concomitantly with the application of said pronged regions of the wipers to the vicinity of the breastline portions of the upper margin.

71. The machine as defined in claim 70 further comprising: a clamping pad located below the wipers; and means for causing movement of the pad against said heel portion of the upper to force it against the corresponding side portion of the last prior to operating the means for imparting forward translation to the wipers.

72. A heel seat lasting machine for wiping the margin of the heel portion of a shoe upper, that extends from the vicinity of its breastlines rearwardly to its heel end, against the corresponding portion of a shoe insole comprising: a support for supporting bottom-up a last having the upper mounted thereon and the insole located on its bottom; a pair of wipers having side surfaces that diverge forwardly from a bight; means constructing the wipers to enable the side surfaces to swing inwardly and outwardly about a vertex that is proximate to the bight; at least one prong in each wiper depending from an otherwise smooth undersurface in a region relatively remote from and forwardly of the vertex; means supporting the wipers adjacent the heel of the last so that said side surfaces are exterior of said heel portion of the upper and last; gripping means located forwardly of the wiping means and above the support on each side of the support; means for actuating the gripping means to grip the upper margin on each side of the last forwardly of said heel portion and exert a pulling stress on the upper to stretch the upper tightly about the heel of the last with the margin of said heel portion of the upper extending upwardly of the insole; means for imparting forward translation to the wipers to cause the bight of the wipers to cross the last to wipe the upper margin at said heel end upon the insole with the prongs remaining exteriorly of the last; means to swing the wipers inwardly about the vertex to cause the remainder of the wiper side surfaces to cross the last and wipe the remainder of said heel portion of the upper margin and to cause the prongs to drag the upper margin in the vicinity of the breast lines inwardly during this movement and stretch the upper tightly about the last; and means for causing the gripping means to release the gripped margin portions concomitantly with the application of the wiper side surfaces to the vicinity of the breast line portions of the upper margin.

73. The machine as defined in claim 72 further comprising: a clamping pad located below the wipers; and means for causing movement of the pad against said heel portion of the upper to force it against the corresponding side portion of the last prior to operating the means for imparting forward translation to the wipers.

74. A motor control mechanism for operating a plurality of motors in a predetermined sequence comprising: a plate mounted for heightwise movement; means for yieldably urging the plate downwardly; a first upwardly facing shoulder on said plate; a first valve positioned adjacent said plate having a first valve stem shiftably mounted therein and positioned in alignment with said first shoulder; a second upwardly facing shoulder on said plate; a second valve positioned adjacent said plate having a second valve stem shiftably mounted therein and positioned in alignment with said second shoulder; means so constructing and arranging said valve stems and shoulders as to enable the raising of the plate to cause the first shoulder to shift the first valve stem and then to cause the second shoulder to shift the second valve stem while the first valve stem is in shifted condition; and means for raising the plate.

75. The mechanism as defined in claim 74 further comprising: a third valve positioned above the plate having a third valve stem shiftably mounted therein and positioned in alignment with the top of the plate; and means so constructing and arranging the third valve stem as to enable the raising of the plate to cause the top of the plate to shift the third valve stem after the first and second shoulders have respectively shifted the first and second valve stems and while the first and second valve stems are in shifted condition.

76. The mechanism as defined in claim 75, wherein the means for raising the plate comprises a pedal that is movably mounted for heightwise movement and is operatively connected to the plate to effect raising of the plate in response to raising of the pedal, and further comprising: a stop member positioned above the pedal; spring means for yieldably urging the stop member downwardly to a predetermined position; and means so constructing and arranging the padel and the stop member as to enable the raising of the pedal and the plate to cause the pedal to engage the stop member between the time that the second shoulder on the plate shifts the second valve stem and the time that the top of the plate shifts the third valve stem.

77. A motor control mechanism for operating a plurality of motors in a predetermined sequence comprising: a plate mounted for heightwise movement; means for yieldably urging the plate downwardly; an upwardly facing shoulder on the plate; a first valve positioned adjacent said plate having a first valve stem shiftably mounted therein in alignment with the shoulder; a second valve positioned above the plate having a second valve stem shiftably mounted therein in alignment with the top of the plate; means so constructing and arranging the shoulder and the valve stems as to enable the raising of the plate to cause the shoulder to shift the first valve stem and then to cause the top of the plate to shift the second valve stem while the first valve stem is in shifted condition; and means for raising the plate.

78. The mechanism as defined in claim 77 wherein the means for raising the plate comprises a pedal that is movably mounted for heightwise movement and is operatively connected to the plate to effect raising of the plate in response to raising of the pedal, and further comprising: a stop member positioned above the pedal; spring means for yieldably urging the stop member downwardly to a predetermined position; and means so constructing and arranging the pedal and the stop member as to cause the pedal to engage the stop member between the time that the shoulder on the plate shifts the first valve stem and the time that the top of the plate shifts the second valve stem.

79. A braking mechanism comprising: a frame; a plate mounted for forward movement in the frame from a prescribed rearward position to an indeterminate forward position; drive means connected to the plate for effecting said movement; strut means connected to the frame; tang means connected to the plate for movement therewith; means so constructing and arranging the strut means and the tang means that they are positioned alongside each other during the entire movement of the plate between said rearward position and said forward position; and means operable to jam the strut means against the tang means when the plate has arrived at said forward position to thereby lock the plate against movement.

80. A braking mechanism comprising: a frame; a plate mounted for forward movement in the frame from a prescribed rearward position to an indeterminate forward position; drive means connected to the plate for effecting said movement; at least one strut mounted on the frame and extending forwardly thereof; at least one tang connected to the plate for movement therewith; means so constructing and arranging the strut and the tang that they are positioned alongside each other during the entire movement of the plate between said rearward position and said forward position; and means operable to jam the strut against the tang when the plate has arrived at said forward position to thereby lock the plate against movement.

81. A braking mechanism comprising: a frame; a plate mounted for forward movement in the frame from a prescribed rearward position to an indeterminate forward position; drive means connected to the plate for effecting said movement; a pair of side struts mounted on the frame and extending forwardly thereof; a center strut mounted on the frame and extending forwardly thereof between the side struts; a tang movably mounted between each of the side struts and the center strut; means connecting each of the tangs to the plate for movement therewith; means so constructing and arranging the struts and the tangs that each tang is positioned between a center strut and a side strut during the entire movement of the plate between said rearward position and said forward position; and means operable to jam the struts against the tangs when the plate has arrived at said forward position to thereby lock the plate against movement.

82. A braking mechanism comprising: a frame; a plate mounted for forward movement in the frame from a prescribed rearward position to an indeterminate forward position; drive means connected to the plate for effecting said movement; a pair of side struts mounted on the frame and extending forwardly thereof; a center strut extending forwardly of the frame between the side struts; a tang connected to the plate and extending rearwardly between the center strut and each side strut; means so constructing and arranging the struts and the tangs that each tang is positioned between a center strut and a side strut during the entire movement of the plate between said rearward position and said forward position; and means operable to jam the struts against the tangs when the plate has arrived at said forward position to thereby lock the plate against movement.

83. The mechanism as defined in claim 82 further comprising: a first plate on the center strut that overlies the tangs and a second plate on the center strut that underlies the tangs, said plates serving to maintain the tangs at the same level as the struts.

84. The mechanism as defined in claim 82 wherein said jamming means comprises: a strap pivoted to a first one of said side struts and extending laterally to the other side strut; a link pivotally connected to said strap exteriorly of said other side strut, said link having a cam surface facing said other side surface that is eccentric with respect to its pivotal connection with the strap; and means for swinging the link about said pivotal connection.

References Cited by the Examiner
UNITED STATES PATENTS

| | | | |
|---|---|---|---|
| 855,831 | 6/1907 | Bayard | 12—145 |
| 2,191,079 | 2/1940 | Chapelle | 12—127 |
| 2,479,575 | 8/1949 | Jorgensen | 12—12.4 |
| 2,501,810 | 3/1950 | Checchia | 12—123 |
| 2,699,078 | 1/1955 | Knosp et al. | 188—74 X |
| 2,871,993 | 2/1959 | Hoelscher | 188—74 |
| 2,908,921 | 10/1959 | Kant | 12—1 |
| 2,926,367 | 3/1960 | Gilbride et al. | 12—12.4 |
| 3,087,176 | 4/1963 | Deschenes | 12—127 X |
| 3,102,282 | 9/1963 | Kamborian | 12—10.5 |
| 3,241,164 | 3/1966 | Kamborian | 12—10.1 |

PATRICK D. LAWSON, *Primary Examiner.*

Disclaimer 3,320,626.—*Jacob S. Kamborian*, West Newton, and *Michael M. Becka*, Cambridge, Mass. HEEL SEAT LASTING. Patent dated May 23, 1967. Disclaimer filed Sept. 30, 1970, by the assignee, *Jacob S. Kamborian*.
Hereby enters this disclaimer to claims 58 through 73 of said patent.
[*Official Gazette January 26, 1971*]